US012455044B2

(12) United States Patent
Weisenberg

(10) Patent No.: US 12,455,044 B2
(45) Date of Patent: Oct. 28, 2025

(54) APPARATUS AND METHODOLOGY FOR THE ONSITE AUTONOMOUS MANUFACTURING AND PLACEMENT OF A COILED, CANNULAR INTELLIGENT COMPOSITE STRUCTURE FOR THE HIGH VOLUME, LOCALIZED AND RESILIENT STORAGE OF HYDROGEN AND OTHER GASEOUS AND LIQUID MEDIA

(71) Applicant: BrainDrip LLC, Jacksonville, FL (US)

(72) Inventor: Kent Weisenberg, Jacksonville, FL (US)

(73) Assignee: BRAINDRIP, LLC, Jacksonville, FL (US)

( * ) Notice: Subject to any disclaimer, the term of this patent is extended or adjusted under 35 U.S.C. 154(b) by 485 days.

(21) Appl. No.: 17/743,142

(22) Filed: May 12, 2022

(65) Prior Publication Data

US 2022/0412511 A1 Dec. 29, 2022

(51) Int. Cl.
*B29C 70/54* (2006.01)
*B29C 70/32* (2006.01)
*B29C 70/70* (2006.01)
*F17C 1/16* (2006.01)
*F17C 13/02* (2006.01)
*G01M 3/22* (2006.01)

(52) U.S. Cl.
CPC ............... *F17C 1/16* (2013.01); *B29C 70/32* (2013.01); *B29C 70/545* (2013.01); *B29C 70/70* (2013.01); *F17C 13/02* (2013.01); *G01M 3/227* (2013.01); *F17C 2201/0147* (2013.01); *F17C 2203/011* (2013.01); *F17C 2203/0624* (2013.01); *F17C 2203/066* (2013.01); *F17C 2205/0323* (2013.01); *F17C 2209/2163* (2013.01); *F17C 2209/232* (2013.01); *F17C 2221/012* (2013.01); *F17C 2221/033* (2013.01); *F17C 2270/0147* (2013.01)

(58) Field of Classification Search
CPC ......... F17C 1/16; B29C 70/32; B29C 70/545; B29C 70/70
USPC ........................................................ 73/40.7
See application file for complete search history.

(56) References Cited

U.S. PATENT DOCUMENTS

| | | |
|---|---|---|
| 4,298,330 A | 11/1981 | Davis |
| 5,072,622 A | 12/1991 | Roach et al. |
| 5,395,472 A | 3/1995 | Mandich |
| 5,551,484 A | 9/1996 | Charboneau |
| 5,732,745 A | 3/1998 | Lefebvre et al. |
| 5,732,746 A | 3/1998 | Leroy et al. |
| 6,634,388 B1 | 10/2003 | Taylor et al. |
| 6,935,376 B1 | 8/2005 | Taylor et al. |
| 7,258,141 B2 | 8/2007 | Catha et al. |
| 7,374,127 B2 | 5/2008 | Gallagher et al. |
| 8,567,448 B2 | 10/2013 | Stringfellow et al. |
| 8,567,450 B2 | 10/2013 | Stringfellow et al. |
| 9,310,014 B2 | 4/2016 | Ekelund et al. |
| 9,453,606 B2 | 9/2016 | Catha et al. |
| 10,288,207 B2 | 5/2019 | Littlestar et al. |

(Continued)

FOREIGN PATENT DOCUMENTS

WO 02/079746 A1 10/2002

*Primary Examiner* — David R Deal
(74) *Attorney, Agent, or Firm* — Philip E. Levy; Eckert Seamans Cherin & Mellott, LLC

(57) ABSTRACT

Methods and manufactures disclosed herein generally relate to a cannular composite (ITC) structure composed of multiple layers of sealing, reinforcement, sensing, protection, and interspatial injected materials.

30 Claims, 10 Drawing Sheets

(56) References Cited

U.S. PATENT DOCUMENTS

| | | |
|---|---|---|
| 10,436,667 B2 | 10/2019 | Littlestar et al. |
| 11,112,049 B2 | 9/2021 | Littlestar et al. |
| 2004/0216656 A1 | 11/2004 | Fitzpatrick et al. |
| 2006/0151042 A1 | 7/2006 | Stringfellow et al. |
| 2009/0129721 A1 | 5/2009 | Chen et al. |
| 2009/0308475 A1 | 12/2009 | Stringfellow et al. |
| 2014/0176344 A1 | 6/2014 | Littlestar et al. |
| 2014/0197264 A1 | 7/2014 | Charboneau et al. |
| 2018/0236708 A1 | 8/2018 | Charboneau et al. |
| 2021/0262888 A1 | 8/2021 | Littlestar et al. |
| 2022/0412511 A1 | 12/2022 | Weisenberg |

(a)

(b)

(c)

APPARATUS AND METHODOLOGY FOR THE ONSITE AUTONOMOUS MANUFACTURING AND PLACEMENT OF A COILED, CANNULAR INTELLIGENT COMPOSITE STRUCTURE FOR THE HIGH VOLUME, LOCALIZED AND RESILIENT STORAGE OF HYDROGEN AND OTHER GASEOUS AND LIQUID MEDIA

FIELD OF THE INVENTION

Methods and manufactures disclosed herein generally relate to a coiled-tube structure for the intake, storage, and conveyance of gaseous or liquid media, including but not limited to hydrogen, hydrocarbons, and non-hydrocarbons, and related methods for manufacture. The coiled-tube structure consists of one or more innervated tubular composites, each composed of multiple layers of sealing, reinforcement, sensing and monitoring components, pressure injected fluids, and over-molded structural and protection layers.

BACKGROUND OF THE INVENTION

Storage of hydrogen, hydrocarbon and non-hydrocarbon media is highly important in the dependable supply of feedstock for industrialized resources and refueling operations. As the manufacture and utilization of hydrogen and other renewable energies continues its steep trajectory globally there is a linear requirement for high volume resilient localized storage. Additionally, as the manufacture and sales of hydrogen fuel automobiles and heavy equipment increase the need for resilient localized storage will be mandated. Industrial storage applications for inland and offshore hydrogen production and refueling facilities, power plants, steel mills, auto manufacturers, textile mills, fertilizer plants, mining industry, data centers, etc. and the integrated equipment that effect service for these industries will require safe and resilient localized storage as their proximity to continual supply mechanisms such as pipelines and storage terminals is distant. Absent safe and resilient localized storage options, the efficient and effective use of hydrogen is not possible for these industries. Non-hydrogen gases such as natural gas also require these primary and redundant storage solutions. For example, for hot climate gas fired electricity production, natural gas utilization is highest during the elevated temperatures of the day and the least during nighttime hours. The storage of natural gas allows supply to match requirement. Many industrial resources, such as power stations or petrochemical facilities, are connected via pipelines or tube trailers to deliver media, such as natural gas, liquified natural gas components, such as ethane or LNG. In the event of a supply interruption, and without a dependable localized storage solution, the industrial resource will negatively suffer operationally or financially. For these reasons, there remains a need for improved systems and methods for storage of hydrocarbon and non-hydrocarbon media.

The commodity value of hydrocarbon and non-hydrocarbon media feedstock varies by contracted period—yearly, monthly, daily, and hourly. Utility and industrial feedstock users maintain storage to park oversupply and safeguard against market price spikes. Pipelines for hydrocarbon and non-hydrocarbon media feedstock are generally located underground but, in some situations, above ground. Pipelines placed above ground are subject to security risk, accidental access, and damage. Additionally, above ground pipelines take up valuable surface area, and increase public safety, environmental and security concerns.

Large quantities of hydrocarbon and non-hydrocarbon media have been traditionally stored underground both in rock bearing depleted reservoirs or desalinated salt deposits. There are various active and inactive underground storage facilities for such media. Historically, underground rock bearing storage methods experience persistent losses due to nonconformity in the rock layers. Portions of higher permeability and porosity rock layers, ineffective seals due to failing cement jobs around casing, and inaccurate geological assumptions determining storage design contribute to typical losses. The permeation of these media historically has shown drastic harm to the atmosphere and the environment. Solid particulates, water, and native hydrocarbon and inert gaseous components need to be removed and processed out of discharged storage feedstock. This intrinsic permeation in these underground and cavernous structures is exponentially increased when utilized for pressurized hydrogen due its relatively small and light molecular structure as compared to other gas compositions. These typical losses and treatment costs are unforeseen until rock bearing underground storage systems are operational. Natural gas and other media are generally stored in bulk in underground geologic settings commonly referred to as Salt Caverns or Granite Caverns. These caverns act as seasonal storage for pipelines, industrials, and utility systems. Specific geologic conditions must exist for safe storage of media. Due to the necessity of these specific geologic requirements, many parts of the world are not conducive to storing media in caverns and are solely reliant on pipelines, trucking and liquified ships to deliver the excess media required during peak demand.

Another common methodology for natural gas and other gaseous media, and more recently hydrogen, is the utilization of tube trailers or tube containers. These trailers or containers typically are a series of longitudinally or vertically organized pressure vessels of various diameters and lengths. The vessels affixed on or in these trailers and containers are filled with the gaseous media and then transported to the end user facility where they are utilized for localized storage until the energy is needed. The main disadvantage of these types of localized storage is that they require initial transport from the service provider to the end user, and most typically also require round-trip transport back to the supplier for refill once empty, resulting in considerable transportation costs, emissions from diesel engines, and safety concerns. Additionally, these types of localized storage afford limited storage capacity per surface area due to their vessel configuration which is constrained due to size limits for transportation as regulated by the Department of Transportation (DOT). Additionally, the internal storage pressure inside the vessels is also limited by the DOT for safety reasons, which results in less volumetric capacity per surface area of storage. Equally, the cost of purchasing or leasing these mobile storage systems is significant, due to these DOT regulations. Another drawback to the tube trailer or vessel container is that to provide meaningful storage capacity, multiple trailers or containers are required to be onsite, along with pressure reduction systems capable for each staged trailer which consumes large plots of land dedicated solely to this storage option. These trailers and containers need to be refilled often which either involves multiple trucks delivering filling media to site or the containers being transported back to service facility and being refilled only to be delivered back to the end users' location. This significantly increases the cost of the media, and more importantly creates the potential for the end user to experience shortfalls in the amount of available media, particularly during severe weather events, due to disruptions in the transport and refueling of storage vessels. Conversely, it is during these extreme weather events, especially winter storms, that the demand for media increases for these end users.

Another common methodology for natural gas (and other gaseous media) is delivery from overseas suppliers in ships, often in liquified form, in a Just in Time delivery schedule. This creates significant reliance on overseas supply partners, whose energy regulations are much less stringent than the United States, to fill the supply deficit during these peak loads.

Several designs have been utilized for pressurized fuel storage that are beyond well-known methods such as above ground pressure vessels/tanks, tube tanker trucks and tube racks. For example, Carver et al. (U.S. Pat. No. 6,826,911) disclose a storage facility embedded in a retrofitted transportation tunnel, such as a decommissioned highway, a railroad, an aqueduct, or tunnel. Natural gas may be delivered via a transmission line or a rail car. Stenning et al. (U.S. Pat. No. 5,839,383) disclose a system comprising continuous steel conduit wound around a spool for holding natural gas that can be transported by ship or vessel. Barker (U.S. Pat. No. 10,145,512) discloses a compressed natural gas storage and dispensing system which includes a set of tanks configured in parallel to store compressed natural gas for variability in demand. The system is designed to be used for fueling CNG vehicles.

Additionally, an onsite storage system in a "looped" or "serpentine" oriented configuration constructed of prefabricated steel pipe sections and radius connections has been disclosed (U.S. Pat. No. 10,995,905). This onsite gas loop storage system provides improved methodologies over cavern, pipeline, tank, onboard metal coils, pressure vessels and trailer mounted tube storage. Despite disclosure of the design, this system has not, in fact, been implemented due to extortionate cost and carbon and environmental footprint.

There are, however, numerous systemic problems associated with the known materials, configuration, and methodologies of the gas loop methodology. These problems are associated both with (a) the materials currently employed for storage and proposed for the serpentine methodology, and (b) the proposed technology for introducing the required turns into the overall pipe design.

The first noted drawback with current looped or serpentine configured steel pipe storage systems is that they require intensive surface area, excavation, time and intensive material, labor, equipment, shipping, handling, and installation costs due to the dimensions, weight and connection practices of the steel pipe components. Additionally, these serpentine onsite storage systems have significantly reduced storage capacity due to their geometrical configuration and relatively low resistance to internal pressure. The looped configuration utilizes pre-manufactured 180-degree bends on each end to connect the parallel runs of straight pipe, therein creating a space between each straight run of pipe that is equal to or greater than the OD of the steel pipe being utilized. This continual physical space between the steel pipes is compulsory and combined with finite industry standard pressure ratings, imposes constraints on the overall volumetric storage capacity of the system.

Furthermore, with the utilization of prefabricated steel pipe this reduced storage capacity is exacerbated by the finite internal pressure rating of steel components of welded carbon steel pipe sections. Additionally, carbon steel, especially at the welded connections, is highly susceptible to corrosion which in turn can result in pinholes and thin wall areas within the pipeline structure which is an obvious impediment to storage efficacy and both a human and environmental safety concern to long term underground storage of potentially hazardous media.

In addition, the carbon steel surface on the inner pipe structure affords significant adherence for the media being stored. This propensity for the media to adhere or "stick" to the steel substrate creates an issue when attempting to batch different media or change storage media in the same structure.

Steel substrates tend to hold media residuals or FAME which are very hard to remove from the substrate, and which can create detrimental contamination when batching or conveying the storage from one type of media to the other. A solution to this issue is to line the pipe with a coating or liner prior to or after application; however, this significantly increases the cost and impacts design life, since the coatings typically do not have the required design life for long term safe storage.

In addition, serpentine configured storage systems constructed of steel pipe create exceedingly high carbon emissions in their manufacture, delivery and onsite fabrication. Current methods also create a large jobsite inventory footprint due to their design and manufacture as tubular structures such as they utilize steel pipe used in their composition that requires continual storage and handling onsite. The significantly increased shipping, handling inventory footprint often creates environmental damage, public and business disruption, and other logistical and environmental issues. Typically, these steel pipes are delivered to the proposed storage site in 40 ft. long sections and, depending on the diameter, require up to 40 roundtrip trucking events per linear mile (1.6 km) of storage structure installed which significantly increases shipping, handling, and environmental costs.

Another systemic problem with the serpentine configured systems is the joining methodologies. Current methodologies utilize standard premanufactured sections of steel pipe These core pipes are typically limited to 40 ft. in length due to over the road shipping restrictions for length and weight. These sections or "sticks" of core pipe require joining the ends to each other as well as the connection of 180-degree bends at directional transition to create the serpentine configured system. This connection process creates a welded butt or splice joint every 40 ft as well as two butt joints at every end of the run where the 180-degree fitting is welded on. These welds are unreinforced and are subjected to both axial and radial loading as well as corrosion which can cause rupture as well as contact to the stored media which can create a corrosive environment. Typically, welding is completed with MIG, TIG or SMAW methods. Beyond the associated increased labor and handing costs for safely aligning and securing these connections or joints the process creates an increased potential for future leakages in the storage system joints due to galvanic corrosion or corrosion caused by the contact of dissimilar metal. These leaks and ruptures often create catastrophic environmental and/or human damage as historical events have demonstrated.

An additional systemic problem with this current practice of utilizing steel pipe for storage is that the versatility of materials that can be utilized is inherently restricted. The current serpentine configured system is constrained to the use of carbon steel or similar premanufactured pipe materials. Steel pipe experiences a permanent deleterious effect when exposed to high pressure hydrogen resulting in irreversible decrease in long term resistance to diffusion thus increasing the potential for leakage, embrittlement, fatigue, and/or failure. The use of carbon steel pipe for long term storage of hydrogen, other light gases or aggressive media additionally increases the potential for long term fatigue (diffusion and/or corrosion related), deterioration, and/or failure.

Certain flexible composite liners are currently in use both for gaseous pipelines and pipeline rehabilitation. Typically, these liners are prefabricated in a straight orientation and are spooled post-fabrication for transport to the jobsite on spools. This manufacture process leads to deficiencies, both in the diameter of the liner (generally limited to 10 inches or smaller), and in the requirement to introduce curvature post-fabrication which, as discussed throughout, imposes limitations on the pressure that can be accommodated. In contrast, the innervated tubular composites disclosed herein can both have a larger diameter—due to their onsite manufacture, unconstrained by transport restrictions—and can handle higher pressures—due to introduction of curvature during manufacture.

In further consideration of the currently available materials and methodologies for the high pressure and high-volume storage of hydrogen and other hydrocarbon and non-hydrocarbon media, an improved and innovative solutions for the storage and transport of these media are required.

BRIEF DESCRIPTION OF THE DISCLOSURE

Overview

Provided herein is a coiled-tube structure for the intake, storage, and conveyance of gaseous or liquid media. The media may consist of commercially or industrial important gases and liquids, including but limited to hydrogen, hydrocarbon, and non-hydrocarbon. The coiled-tube structure may be particularly valuable for gases and liquids relevant to renewable energy sources, including hydrogen, natural gas, natural gas/hydrogen mixtures, renewable natural gas, ammonia, and carbon dioxide. The media may be at ambient pressure or may be pressurized.

The coiled-tube structure consists of one or more innervated tubular composites disclosed herein, each composed of multiple concentric layers of sealing, reinforcement, sensing and monitoring components, pressure injected fluids, and over-molded structural and protection layers. The structure can be positioned either above ground, sub-terra, or sub-terra with multiple tiers of individual coils, and can be located at end-user industrial facilities such as hydrogen production facilities terminals, power plants, mining operations or data centers. The structure can be installed expeditiously and with materials and methodologies that afford a meaningful reduction in carbon emissions over existing technologies.

The structure can efficiently, safely, and reliably intake, store and/or convey large quantities of gaseous or liquid feedstock on a small footprint. The structure can be utilized to store varying compositions of gaseous materials through isolation in separate and varying sized sections of the same coil structure allowing for onsite blending of gases such as hydrogen and natural gas prior to conveyance. Because of the coiled configuration and high internal pressure rating of the reinforced cannular structure that is made possible by the improved manufacturing methodology, the volume of gaseous or liquid feedstock stored is maximized while the space required, and proximity to use, is minimized.

These structures can provide faster, more affordable, and efficient systems for storage and conveyance of both traditional and renewable energy media. These systems can accommodate on-demand peaking and back-up operations of industrial facilities, and for the refueling of equipment such as large hydrogen or natural gas fueled mining equipment.

The composite materials and coiled arrangement of the disclosed coiled-tube structure can provide for significantly increased pressure ratings, volumetric capacity, scalable capacity, deliverability, resiliency, and customization, which further makes utilization of the coiled-tube structure efficient as well as economically and operationally desirable.

The materials utilized in the innervated tubular composites are much better suited than are currently employed materials, i.e., steel tube, tanks or flexible composite piping for the use of specialized materials with higher chemical and permeation, diffusion, and solubility resistance to the transmitted or stored media. Equally, the materials utilized in the innervated tubular composites disclosed herein are much better suited to provide longer design life at elevated pressures than these currently employed materials.

The coiled-tube structure can provide various benefits to the user, including but not limited to one or more of the following: data acquisition, monitoring, self-inspection, redundant leak protections, and media odorization for safe, reliable, and long and short-term storage and access to stored media.

Also provided herein are coiled innervated tubular composites for which curvature is incorporated into the structure during onsite manufacture. The manufactured structure is therefore intrinsically curved, and will have the curved geometry that is required for the coiled design. The alternative of introducing curvature into a linear tube after its manufacture, even if the material is flexible enough to permit this distortion, is nonideal. The act of flexing the linear material into a curved shape can impose a structural cost that can weaken the structure, fracture sensor wires and limit storage capabilities. By introducing curvature into the tube during manufacture, this structural cost can be minimized.

Also disclosed herein is a coiled-tube structure for the intake, storage, and conveyance of gaseous or liquid media. and monitored with internal diameters ranging from 16 inches (406 mm) to greater than 54 inches (1372 mm) and more particularly relates to such innervated tubular composites formed of multiple layers, and even more particularly relates to such innervated tubular composites for the high pressure and high-volume storage and conveyance of gas or liquid media, including but not limited to hydrogen and hydrogen derivatives, hydrocarbons including natural gas and natural gas derivatives, natural gas/hydrogen mixtures, and non-hydrocarbons such as ammonia and carbon dioxide, while in a coiled orientation.

ITC

Accordingly, provided herein, in an exemplary embodiment, is a coiled innervated tubular composite ("ITC"), comprising one or more of the following assembly of concentric tubes, from innermost surface to outermost surface:

(a) a sealing layer,
(b) an axial reinforcement layer,
(c) one or more hoop reinforcement layers,
(d) an optional mesh-filled annulus, and
(e) a protective layer;
each layer or assembly optionally further comprising a sensor array layer; and
the innervated tubular composite further comprising an interspatial annular cylinder between each adjacent assembly of concentric tubes.

Also provided herein, in an exemplary embodiment, is a coiled innervated tubular composite ("ITC"), comprising one or more of the following assembly of concentric tubes, from innermost surface to outermost surface:
(a) a sealing layer,
(b) an axial reinforcement layer,
(c1) a first hoop reinforcement layer,
(c2) a second hoop reinforcement layer,
(d) an optional mesh-filled annulus, and
(e) a protective layer;
the second hoop reinforcement layer being wound with the opposite handedness as the first hoop reinforcement layer;
each layer or assembly optionally further comprising a sensor array layer; and
the innervated tubular composite further comprising an interspatial annular cylinder between each adjacent assembly of concentric tubes.

The cannular structures disclosed herein can be used for the storage and conveyance of gaseous or liquid media, most specifically but not limited to gaseous hydrogen and hydrogen derivatives, hydrocarbons including natural gas and natural gas derivatives, natural gas/hydrogen mixtures, non-hydrocarbons such as ammonia and carbon dioxide, ethane, crude oil, gasoline, other potentially hazardous liquids as well as the storage and conveyance of sewage, potable and non-potable water.

The innervated tubular composites disclosed herein can eliminate the dangers and environmental concerns of steel pipelines, tube trailers or tube containers and caverns needed for feedstock refining processes and unforeseen losses, thus providing greater safety, quality, and quantity control. The methods of storage disclosed herein can significantly lessen the environmental impact while promoting the efficient and effective storage and use of renewable energies.

The innervated tubular composites disclosed herein can store pressurized gas and liquids in a continuous and fiber reinforced cannular structure with an autonomously amended radius to produce a coiled configuration. The coiled configuration of continuous fiber reinforced cannular structures provides the most economical, efficient materials and methodology as well as the highest storage volume capacity per surface area of any storage system currently available.

In consideration of the larger ID of the innervated tubular composites disclosed herein, the high internal pressure resistance or pressure ratings to 15,000 psi (1034 bar), and the safety factors required per the design of the coiled cannular structure configuration, the methods of manufacture disclosed herein can satisfy demanding performance requirements.

The innervated tubular composites disclosed herein separate unidirectional axial and hoop reinforcement members in their respective, designed, and engineered orientations to the structure to assure significantly increased resistance to the applied stresses (internal, surge and cyclic pressures) as compared to resistance of unreinforced, bidirectional reinforcement materials or manipulated reinforcement as utilized with current methodologies.

The innervated tubular composites disclosed herein can comprise thermoplastic and para-aramid, carbon fiber, carbon fiber/graphene, UHMWPE or other aramid and natural fiber reinforcement micro-rope filaments making it as much as 20× lighter than steel pipe while providing the cannular structure with as much as 15× the internal pressure rating as that of steel pipe.

Use of these materials offer exceptionally higher strength to weight ratios, higher fatigue resistance and exceptional dimensional stability as carbon fiber possesses a low to zero coefficient of thermal expansion (CTE). Conversely, steel pipe has a relatively low strength to weight ratio, low fatigue resistance and a high (10.8 to 12.5) CTE which directly corresponds to lessened pressure rating as well as a decrease in design life.

As discussed in detail below, the structures can comprise micro-ropes which contain highly oriented tow material. These ropes are well suited to use in manufacture of the innervated tubular composite, particularly in the coiled structures, for which orientation of the material provides exceptional strength and efficiency.

In contrast to the aforementioned serpentine configured systems, the innervated tubular composite is monolithic in its materials and construct. Splice or butt joint connections are required only every 2,000 ft (609 m)-8,000 ft. (2438 m) depending on diameter of the cannular structure. Furthermore, any seams or connections in the innervated tubular composite are over-molded as well as fully supported with external reinforcement, so they only are exposed to compression loads. Equally, the potential for leaks or ruptures is highly mitigated. In contrast, as previously discussed, the steel pipe joints or connections of the serpentine configured systems lack reinforcement and are susceptible to long term fatigue. All connections or seams in the innervated tubular composites disclosed herein are preferably constructed from identical or similar thermoplastic, non-metallic materials, so corrosion is not a factor.

Coiled-tubes may be partitioned by the inclusion of isolation valve fittings. These fittings will facilitate access to the feedstock, and can further allow isolation of one or more partitions for inspection or repair. The valve may act to connect or isolate two partitions. The valve may also contain a port to permit transfer of media between an external reservoir and one or both of the partitions connected to the valve. In some embodiments, individual partitions in a single coiled-tube may be used for the storage of different types of media, thereby increasing the operational flexibility of the ITC facility.

For most applications, adjacent layers in an assembly of concentric tubes are manufactured in contact with each other. By way of example, a sealing layer is generally in contact with the axial reinforcement and embedded sensor layer to its exterior. As disclosed below, the mesh-filled annulus, upon initial manufacture can initially contain void space; this void space can be filled with a liquid or resin.

In some embodiments, the ITC is curved, and can optionally form a coil. Preferably, the coil will be oriented horizontally when appointed. The coil can have a constant radius of curvature throughout. For such a coil, oriented horizontally and having more than one complete loop, successive loops can be stacked vertically, in the manner of a spring. Alternatively, the coil can have a smoothly varying radius of curvature. For such a coil, oriented horizontally and having more than one complete loop, successive loops can be arranged in the manner of a spiral.

For both spring-shaped and spiral coils, adjacent loops of the structure can be located substantially in contact. In this manner the structure occupies a minimum of surface area and a maximum in volume of storage.

Innervated tubular composites containing two assemblies can contain an annular void space between them, in the case where the ID of the outer structure is larger than the OD of the inner structure. The annular void can be left empty or, preferably, the annular void can be filled, via injection, with a flowable liquid or a flowable and curable resin. The flowable liquid or flowable and curable resin can provide the functionalities of strain absorption due to exterior movement caused by weather events or seismic events. The flowable liquid or flowable and curable resin can also provide additional resistance to both buckling in sub-terra or stacked installations. The flowable liquid or flowable and curable resin can also provide self-sealing characteristics and/or the odorization of gaseous media such as hydrogen in the event of a leakage event.

In principle, any two adjacent layers can be manufactured to create a void between them, which can be filled with a liquid or resin. In practice, the manufacturing methods disclosed below lend themselves best to manufacture of layers in close contact.

The disclosure provides for an optional mesh-filled annulus, preferably located between the hoop reinforcement layer and the protective layer. The material that constitutes the mesh can contain void space which can be filled, via injection with flowable and curable resin, much like the annular void between two concentric cannular assemblies.

ITC Facility

Also provided herein is a plurality of the aforementioned coiled innervated tubular composites. The plurality can consist of two or more spiral coiled structures, oriented horizontally, and stacked vertically. Alternatively, the plurality can consist of two or more spring-shaped coiled structures, oriented horizontally, and arranged concentrically.

Also disclosed herein are facilities for the storage of liquids or gases, the facility comprising one or more innervated tubular composites and suitable terminations for emptying, filling, pressurizing, and/or depressurizing liquid or gaseous media. The facilities can be aboveground or, preferably, sub-terra. Compact layout of the ITC, such as in spiral and spring-shaped geometries are preferred, to minimize the total volume required for a given storage volume. Facilities can consist of vertical stacks of individual horizontally oriented spirals, or alternatively can consist of groups of spirals arranged around a common vertical axis. For a given storage volume, a sub-terra facility may span a large surface area to a shallow depth, in locations where excavation is difficult. Conversely, for the same storage volume, a sub-terra facility may span a smaller surface area but to a greater depth, where land is difficult to obtain. In either case, the one or more ITC can be in an aboveground or underground vault or engulfed with compacted soils. The vault may be constructed from structural concrete or a composite. The vault may be constructed to allow access to the ITC during operation, for maintenance, inspection, or intervention. The vault may be fitted with vents for air circulation. The vault may be fitted with gas sensors, optionally incorporated with vents, for early detection of leakage from the ITC. The one or more ITC may be substantially buried underground, with at-grade access provided only to only terminations. The ground surface above the ITC may be reclaimed for other uses, such as for commercial or private utilization. By way of example, sub-terra ITC facilities can provide above ground surface area that can be left vacant or the utilization for parks, windmill farms, solar panel arrays, etc.

In some embodiments, ITC facilities may provide multi-level structures to support two or more tiers of horizontally oriented spiral coiled-tubes. These structures may support the weight of one or more of the coiled-tubes, and may also provide access to all aspects of a coiled-tube, in order to facilitate inspection and repair when required.

In some embodiments, an ITC facility may contain at least one ITC which has been partitioned by the inclusion of one or more isolation valve fittings. In further embodiments, individual partitions in the at least one ITC may be used to store different types of media.

Forming Mandrel

Also provided herein, in an exemplary embodiment, is a forming mandrel for the manufacture of an innervated tubular composite. The mandrel is a tube, optionally solid, but preferably hollow, and is cantilevered, i.e., it is directly supported at only one end. The OD of the mandrel is the same as the desired ID of the cannular structure to be manufactured. Preferably, the OD of the mandrel can be adjusted to suit the on the required design of the coiled-tube structure. The mandrel is designed so that an innervated tubular composite can be manufactured by applying the various cylindrical layers in sequence: A nascent structure at the supported end, containing only the innermost layer, is advanced towards the unsupported end, and the various cylindrical layers, from innermost to outermost, are applied successively as the growing structure moves downstream.

The mandrel may also incorporate design features to facilitate the manufacture of a curved ITC, including an ITC whose radius of curvature is varied along its length. This can be accomplished by use of a mandrel with a fixed radius of curvature, suitable for the manufacture of coiled ITC with uniform radius of curvature. Alternatively, an articulating mandrel whose radius of curvature can be amended during manufacture, can be used for the manufacture of coiled ITC with varying radius of curvature along its length. In varying-radius manufacture, the articulating mandrel can be thermally controlled to allow for the heating of the sealing layer material during manufacture, thus allowing malleability during fabrication. Using this mandrel, a spiral-shaped ITC can be manufactured.

The mandrel thereby facilitates the manufacture of innervated tubular composites in the following manner: manufacture is initiated at the supported, or upstream, end of the mandrel with formation of the leading end of an innermost cylindrical layer, which envelops the mandrel. The leading end is then advanced down the mandrel, pulling the innermost layer, representing the growing innervated tubular composite, behind it. Various stations are located along the length of the mandrel, exterior to both the mandrel and the structure being manufacture. At each station, a cylindrical layer is formed on the exterior of the layer which is outermost at that station. At each station, the newly formed cylindrical layer then becomes the outermost layer of the growing structure. The finished end of the innervated tubular composite is then dismounted from the mandrel at the unsupported, or downstream, end.

Optionally, the entire mandrel, or alternatively each pivoting segment in an articulating mandrel, contains heating equipment to soften an innermost thermoplastic sealing layer, facilitating formation by decreasing the material's rigidity and resistance to deformation. This mechanism will be particularly important for manufacture of coiled-tube structures. Optionally, cooling equipment is located at or near the downstream end of the mandrel to bring a heated ITC back to ambient temperature.

AMV

Also disclosed herein is an autonomous manufacturing vehicle ("AMV"), comprising machinery for manufacturing an innervated tubular composite. The AMV comprises a forming mandrel and a series of stations exterior to the mandrel for the manufacture of the various layers of the structure. The AMV can be towed or, alternatively, self-propelled and powered by hydrogen, battery, hydrogen/ battery, or traditional fuels. Because of its mobility, the AMV can be located directly to a site, greatly simplifying transportation of the structure. Preferably, the structure is appointed to its site as it is being manufactured, with the growing structure being directed to its destination. This strategy circumvents the problems that might arise with transportation or storage of completely formed structures.

Just as importantly, compared to current technologies, the AMV will afford the ITC installation process a substantially smaller jobsite and a significantly reduced carbon footprint. The AMV's automated manufacturing equipment can be permanently housed in a customized intermodal container to allow for the transporting of the mobile factory on a flatbed trailer to and from jobsites. The AMV can then be affixed to a drive carrier unit. The AMV and drive units can be powered by rechargeable batteries for all drive train mechanics, steering systems, and hydraulic systems, and can possess solar power systems for all incidental low current power needs such as lights and power outlets. The internally contained automation machinery for ITC manufacturing can be hydrogen powered with a turbine generator or can be powered with conventional hydrocarbon feedstocks, or by a combination of the two. Additionally, when applicable all remote ancillary installation equipment such as winches, forklifts and other material handling equipment can be battery powered.

The AMV contains a plurality of independently pivoting segments, on each of which various fixtures for manufacture of the innervated tubular composite can be mounted. The AMV is suited for the onsite manufacture and appointment of the coiled-tube structure. Preferably, navigation of the AMV is accomplished with a minimum of human input, with all sensing, calculation, and actuator command being carried out autonomously.

Navigation can be provided both to place and orient the AMV prior to manufacture of the structure, and to control the location and orientation of the structure during its manufacture. The AMV can incorporate systems to precisely map terrain and vary the maneuver of the vehicle, accordingly, thus allowing smooth manufacture of the ITC independent of terrain conditions. Importantly, navigation—particularly of the pivoting segments—assures proper geometry for the coiled-tube structure.

The AMV utilizes mobile auto-attuned automated manufacturing for the production and precise appointment of the Innervated Tubular Composite or ITC. This auto-attuned system is controlled by GNSS & GPS inertial navigation systems, with dynamic motion algorithms, 3D models and embedded software systems which utilize a fusion of artificial intelligence, machine learning and computer vision in aggregation of lidar and proximity sensors to determine position, velocity, and absolute orientation. The connectivity of this guidance system to the actuated machine platform systems also assures preciseness of the ITC appointment by providing control of position, pitch, roll and yaw for each of the articulable machine platforms.

The AMV segmented chassis and drive systems are a cooperative array of individually driven mecanum wheels. This horizontally opposed propulsion array affords omnidirectional motion and positioning of the AMV while precisely navigating the advancing radius of the ITC in permanence throughout the completed coil.

The manufacturing components are mounted on independent articulating drive platforms that are interconnected as part of the automate manufacturing assembly. This feature combined with the articulating production mandrel allows for the ITC to be manufactured onsite in an auto-attuned radius of permeance, thus affording radically increased resistance to axial and radial loading imposed by internal pressure.

Methods of Manufacture

Also provided herein, in an exemplary embodiment, is a method for manufacturing a coiled innervated tubular composite as disclosed herein. The method consists of moving a nascent ITC down a mandrel and, at various stations located down the mandrel, applying layers of material onto the growing ITC as it moves down the mandrel, thereby forming successive cylindrical layers from the interior to the exterior of the ITC. The various layers, described in detail below, can consist of solid material including, without limitation, sheets, tapes, fibers. The various layers can also consist of spray-applied material, and can further consist of injecting liquid or resin in a void either between layers or within a layer. Once complete, the finished mandrel is dismounted at the unsupported, or downstream, end.

The method of manufacture can incorporate curvature in at least one of the layers concurrent with the manufacture of the at least one layer. The curvature can be uniform down the length of the structure, i.e., the radius of curvature at any location on the structure is the same. Alternatively, the curvature can be non-uniform down the length of the structure, i.e., the radius of curvature can be different at different locations on the structure. The radius of curvature can smoothly increase or decrease proceeding down the length of the structure.

Also provided herein is a method for manufacturing an ITC in a continual and autonomously amended radius of curvature by automated fabrication on, around and along an articulatable mechanical forming mandrel, having an adjustable radius of curvature and preferably under autonomous control, to produce, maintain and appoint a structurally reinforced cannular structure.

The automated manufacturing and installation process disclosed herein can be as much as 10× more expeditious than the handling, alignment, and manual connection of standard steel pipes in the aforementioned serpentine storage system, thus affording additional and meaningful reductions in overall carbon emissions.

The methods of manufacture disclosed herein can provide a coiled-tube structure for the intake, storage, and conveyance of gaseous or liquid media that minimizes or eliminates the requirement for steel pipes. These methods can therefore circumvent the need for shipping of multiple sections (each being typically 40 ft. long), and therefore do not impose the shipping, handling, and environmental costs associated with the use of steel pipe.

The methods of manufacture disclosed herein can achieve precise appointment of a permanently curved and reinforced cannular structure into a coiled configuration on a surface.

The methods disclosed herein for the manufacture of innervated tubular composites can utilize a wide range of plastic material composition, including but not limited to modified plastics and, more importantly, bio-based and recyclable plastics. The plastic material may contain nanocomposites, including clay-based nanocomposites, or adhered coatings such as graphene, graphene oxide or graphite or similarly impermeable materials. Incorporation of these highly resistant materials can significantly reduce the potential for permeation, diffusion, solubility, leaks, rupture, and/or failure, thereby significantly increasing safety and design life of the storage system.

The methods disclosed herein for the manufacture of innervated tubular composites can utilize materials with specific properties to resist permeation, diffusion and solubility or reaction with the stored media, thus significantly increasing efficacy, safety, and design life. In some embodiments, the materials are incorporated at one or more locations on the ITC that contact the media. In some embodiments, the materials are incorporated at one or more locations on the ITC that are not in contact with the media. In further embodiments, one or more layers of the ITC intervene between the media and the material. It will be appreciated that the incorporation of this material at various locations in the ITC, including but not limited to concentric layers of material, can augment the safety of the structure.

The methods of manufacture disclosed herein can facilitate the application of unidirectional axial and radial (hoop) reinforcement over and around large diameter cannular shaped materials while positioned in an autonomously amended straight or curved arrangement and while advancing along an articulatable forming mandrel for the appointment to a surface for the future storage of hydrocarbon and/or non-hydrocarbon media.

The methods of manufacture disclosed herein can achieve precise engagement and proximity of the unidirectional axial and hoop reinforcement over the outside surface of straight or curved cannular shaped materials in assurance of the specified engagement of the unidirectional and or bidirectional reinforcement when the cannular material is subjected to radial and axial loading from pressurized gases and liquids within the cannular structure.

Also disclosed herein are methods for utilizing flat feedstock that is formed into a cylinder in the onsite manufacturing process. This flat feedstock is stored on large spools, and as a comparative to the example above it would take only 1 spool of material or 1 roundtrip trucking event to deliver the material for one linear mile (1.6 km) of storage, thereby reducing shipping and handling costs and associated carbon emissions by as much as 40×.

Moreover, and more importantly to the fundamental premise of the ITC concept disclosed herein, the flat feedstock manufacturing methodology affords for the use of any commercially available material composition, or any materials in development and not yet commercially available, or any material that can be extruded into flat sheet stock form, making the manufactures disclosed herein significantly more versatile than current methods which have very limited material compositions available for use. The versatility of sealing layer feedstock can also significantly increase utilization of modified recycled, bio-based, and renewable materials for the manufacture of the ITC structures, providing for an overall reduction in carbon emissions.

Also disclosed herein are methods for axial application of multiple, continual circumferentially arranged and segmented fiber reinforcement filaments along the longitudinal axis of the exterior of the formed cannular structure in assurance of continuous interaction with the outside surface of the cannular structure, independent of the cannular structure's curvature at the time of application.

Also disclosed herein are methods for utilization of materials, manufacturing, mechanical and electromechanical function, and methodologies for the manufacture of innervated tubular composites that meaningfully reduce carbon emissions into the atmosphere while also providing a safe intake, storage, conveyance, and monitoring to provide a safe storage solution for traditional and renewable energy media.

Also provided herein, in an exemplary embodiment, is a coiled innervated tubular composite as disclosed herein, manufactured by a process as disclosed herein.

Methods of Storage

Also disclosed herein, in an exemplary embodiment, is a method for storing gaseous or liquid media, the method comprising the step of introducing the material into an innervated tubular composite as disclosed herein.

Construction of ITC Facility

Also provided are methods for construction of facilities with one or more ITC, which include preparing the desired site for appointment of the one or more ITC, providing an AMV along with the necessary supplies, manufacturing each of the one or more ITC, appointing each of the one or more ITC, optionally providing one or more terminations for each ITC, and stabilizing the site as desired post-appointment. Optionally, the one or more ITC can be encapsulated by external application of flowable and curable compounds. Alternatively, the one or more ITC can be installed in underground vaults or engulfed with compacted soils for additional resistance to external dead and live loading, thereby permitting single or multi-level cannular storage coils or full access to the commercial or private utilization of the ground surface over the coiled-tube structure after installation.

Also provided herein, in an exemplary embodiment, is a method for storing gaseous or liquid media, the method comprising the step of introducing the material into an innervated tubular composite as disclosed herein.

Also provided are exemplary embodiments wherein any embodiment above may be combined with any one or more of these embodiments, provided the combination is not mutually exclusive.

As used herein, two embodiments are "mutually exclusive" when one is defined to be something which is different than the other.

BRIEF DESCRIPTION OF THE DRAWINGS

The disclosure will be described in conjunction with the following drawings in which like reference numerals designate like elements and wherein.

DETAILED DESCRIPTION OF PREFERRED EMBODIMENTS

Figure 1:
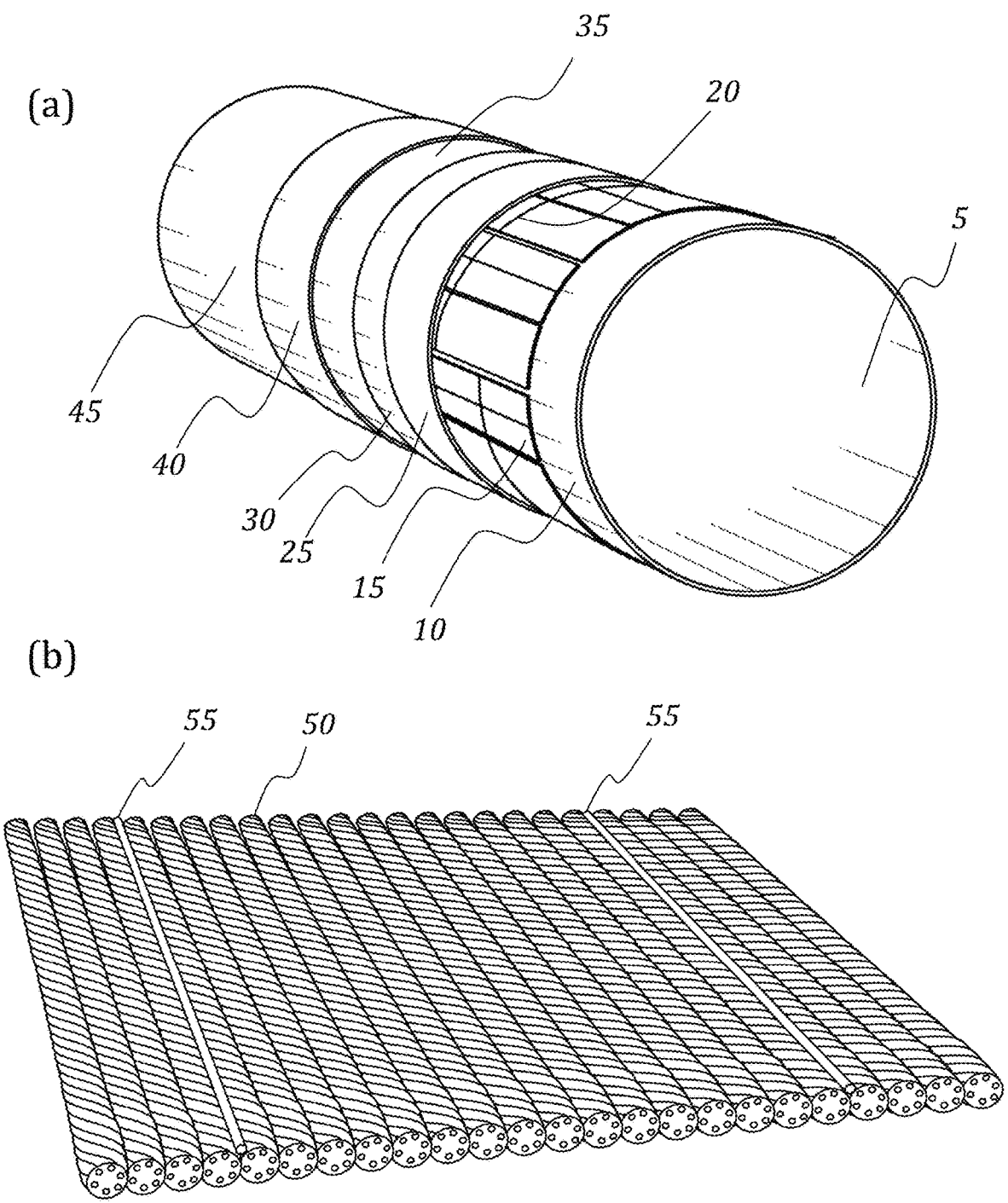
FIG. 1 depicts (a) the various layers in an innervated tubular composite (5) sealing layer, comprising graphene nanocomposite coated with a fusion bonded graphite film (10) fusion bonded titanium film (15) MICRO-ROPE™ axial reinforcement layer (20) helical optical fiber overlay (25) first MICRO-ROPE™ axial reinforcement layer (30) second, contra-helical, MICRO-ROPE™ helical reinforcement layer (35) optional porous matrix (40) bidirectional resin-cured para-aramid over-mold (45) abrasion and UV resistant overlay with embedded $H_2$ detection. Also shown is (b) a section of the MICRO-ROPE™ layer used in the manufacture of the reinforcement layers (50) MICRO-ROPE™ fibers (55) Pd-coated tapered optical fibers.
Figure 2:
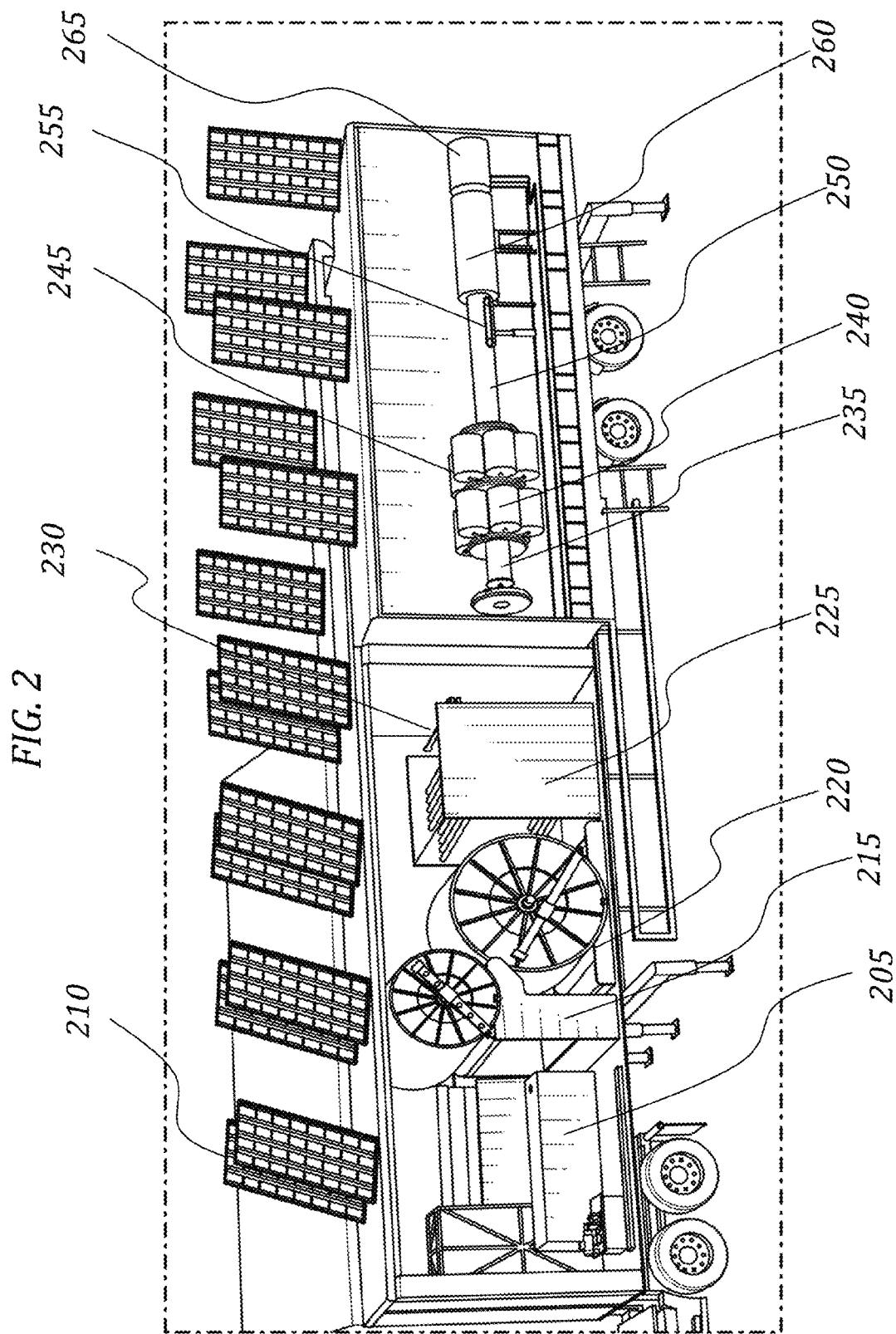
FIG. 2 depicts an autonomous manufacturing vehicle ("AMV") with components for assembling an innervated tubular composite ("ITC") (205) natural gas power generator (210) solar panels (215) reserve spool for sealing layer material (220) active spool for sealing layer material (225) optional material centering mechanism (230) autoclave (235) shaper (240) orbital winder for hoop layer (245) orbital winder for protective layer (250) mandrel (255) roller assembly (260) autoclave (265) spray coating assembly.
Figure 3:
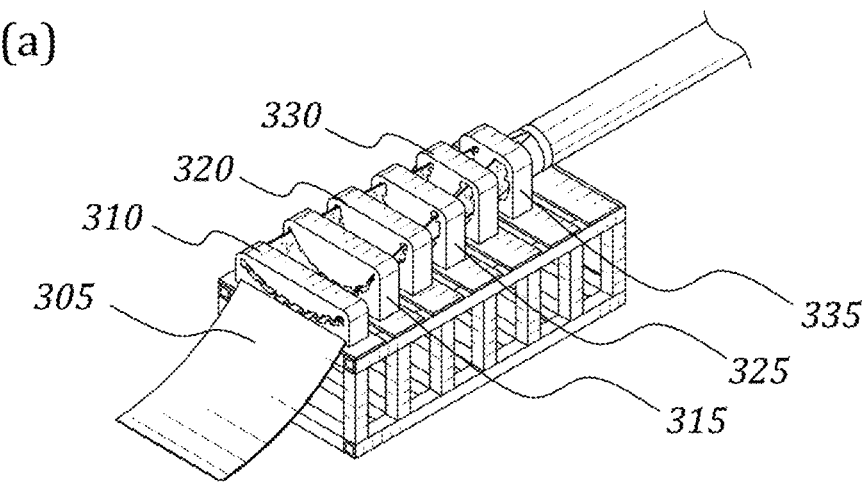
FIG. 3 depicts the shaper mechanism (305) flat feedstock (310)(315)(320)(325)(330)(335) progressive shaping fixtures. Also shown are (340)(345)(350) spools for axial layer (355)(360) spools for hoop layer (365)(370) robots for inspection.
Figure 3:
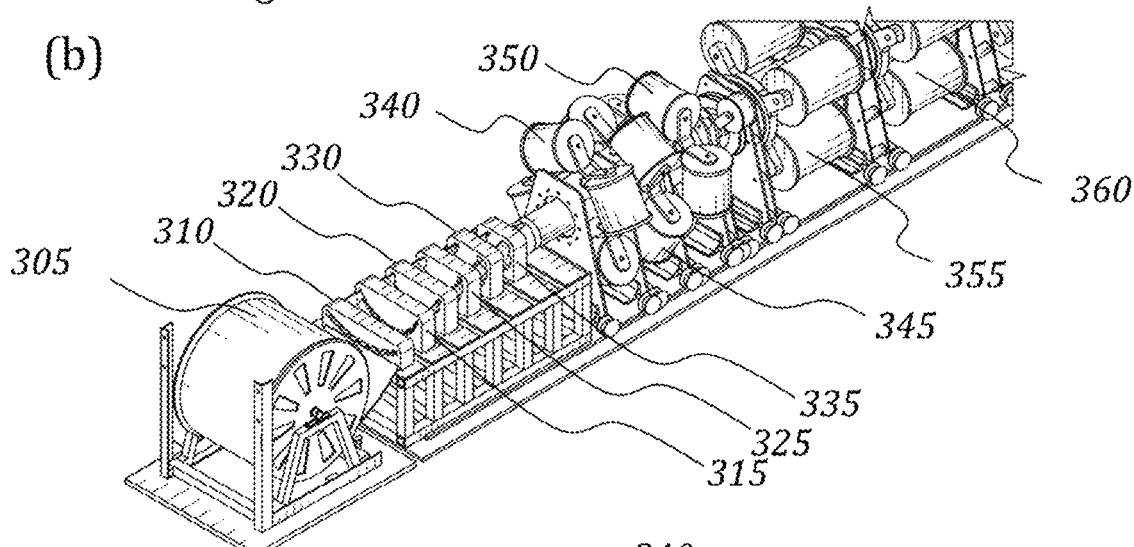
Figure 3:
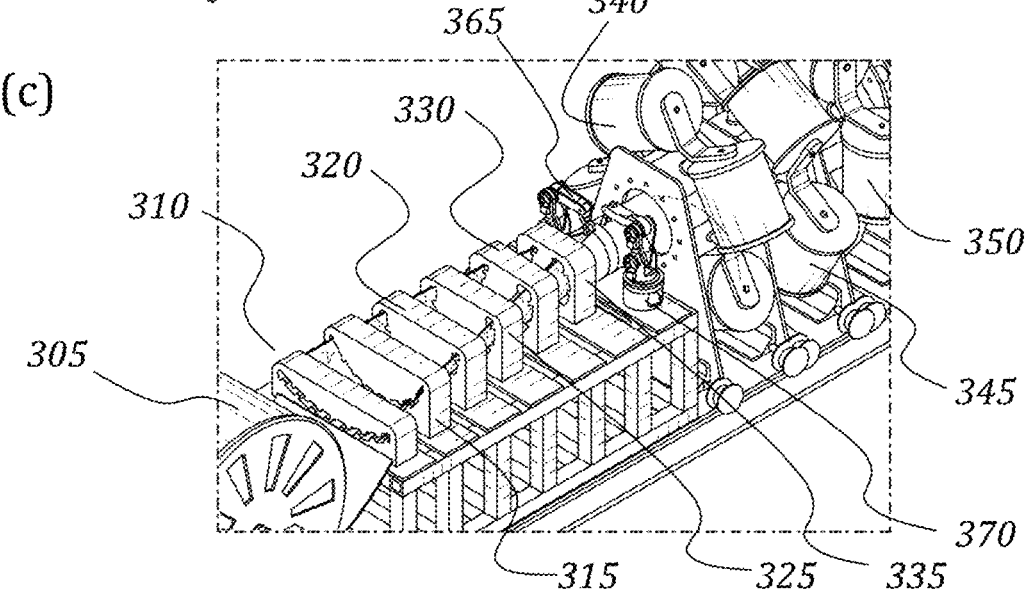
Figure 4:
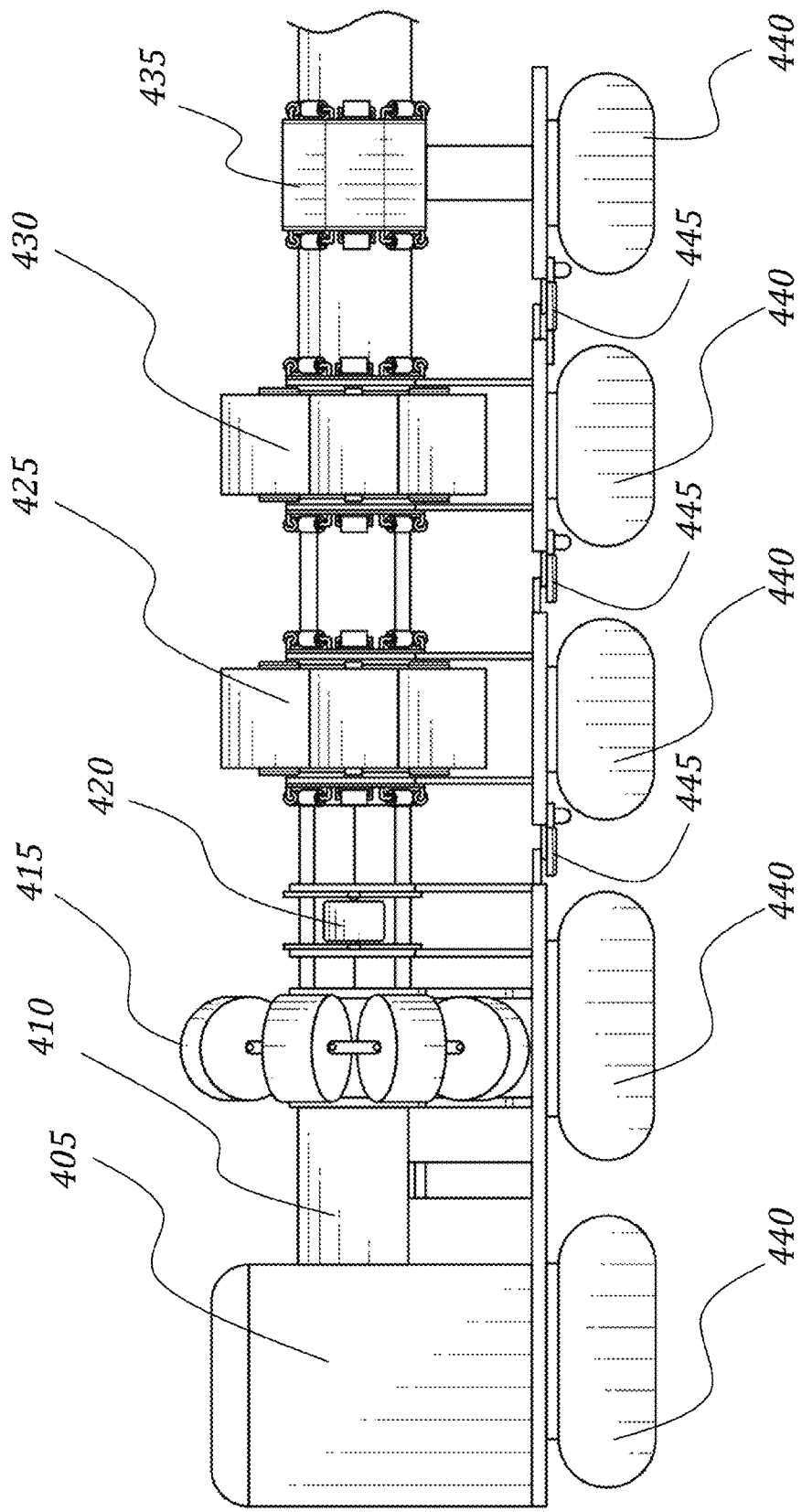
FIG. 4 depicts the core components to the ITC forming mechanism (405) assembly for manufacture of sealing layer (410) mandrel (415) axial reinforcement layer applicator (420) orbital winder for sensor array layer (425) orbital winder for hoop reinforcement layer (430) orbital winder for protective layer (435) autoclave/coating applicator (440) articulating platforms (445) hinges.
Figure 5:
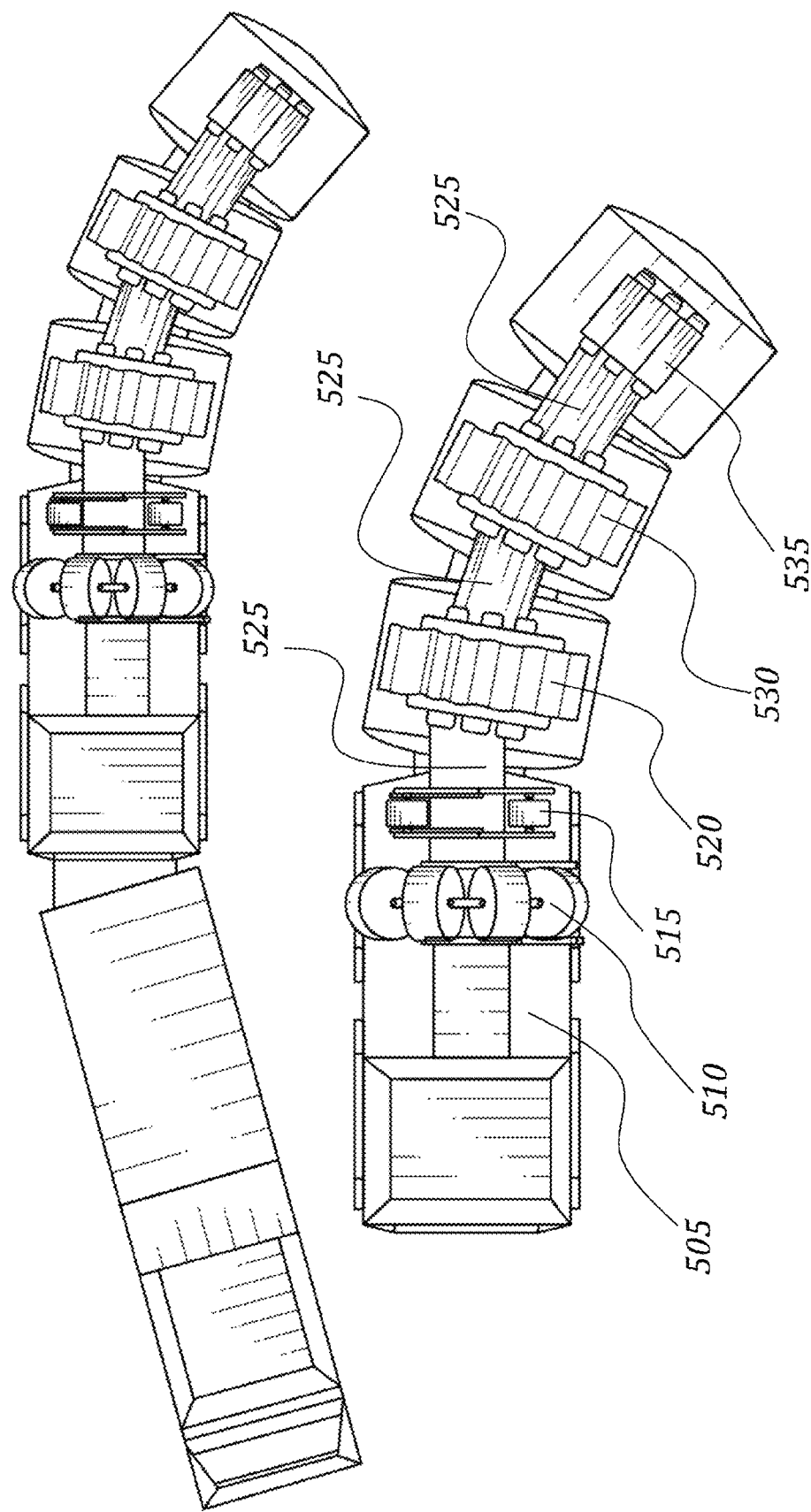
FIG. 5 depicts the core components to an alternate configuration for the ITC forming mechanism that introduces curvature (505) assembly for manufacture of sealing layer (510) axial reinforcement layer applicator (515) orbital winder for sensor array layer (520) orbital winder for hoop reinforcement layer (525) segments of the articulated mandrel (530) orbital winder for protective layer (535) autoclave/coating applicator.
Figure 6:
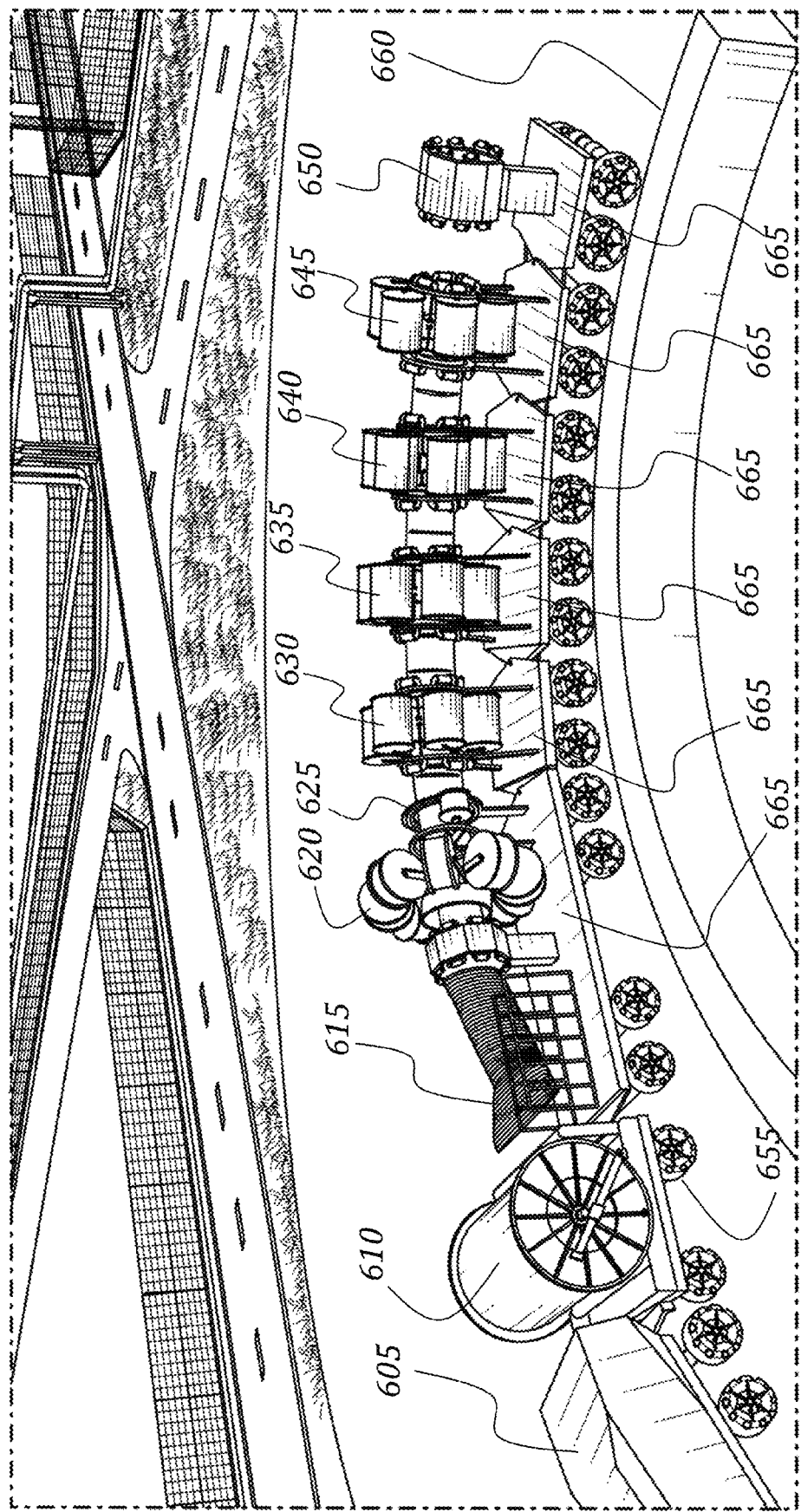
FIG. 6 depicts the AMV (605) drive unit (610) spool for sealing layer (615) sealing layer in the process of forming in the shaper mechanism (620) spool for axial reinforcement layer (625) spool for sensor wire (630)(635)(640)(645) spools for hoop reinforcement layers (650) autoclave (655) mecanum wheel bogie (660) inner wall (665) segment platform.
Figure 7:
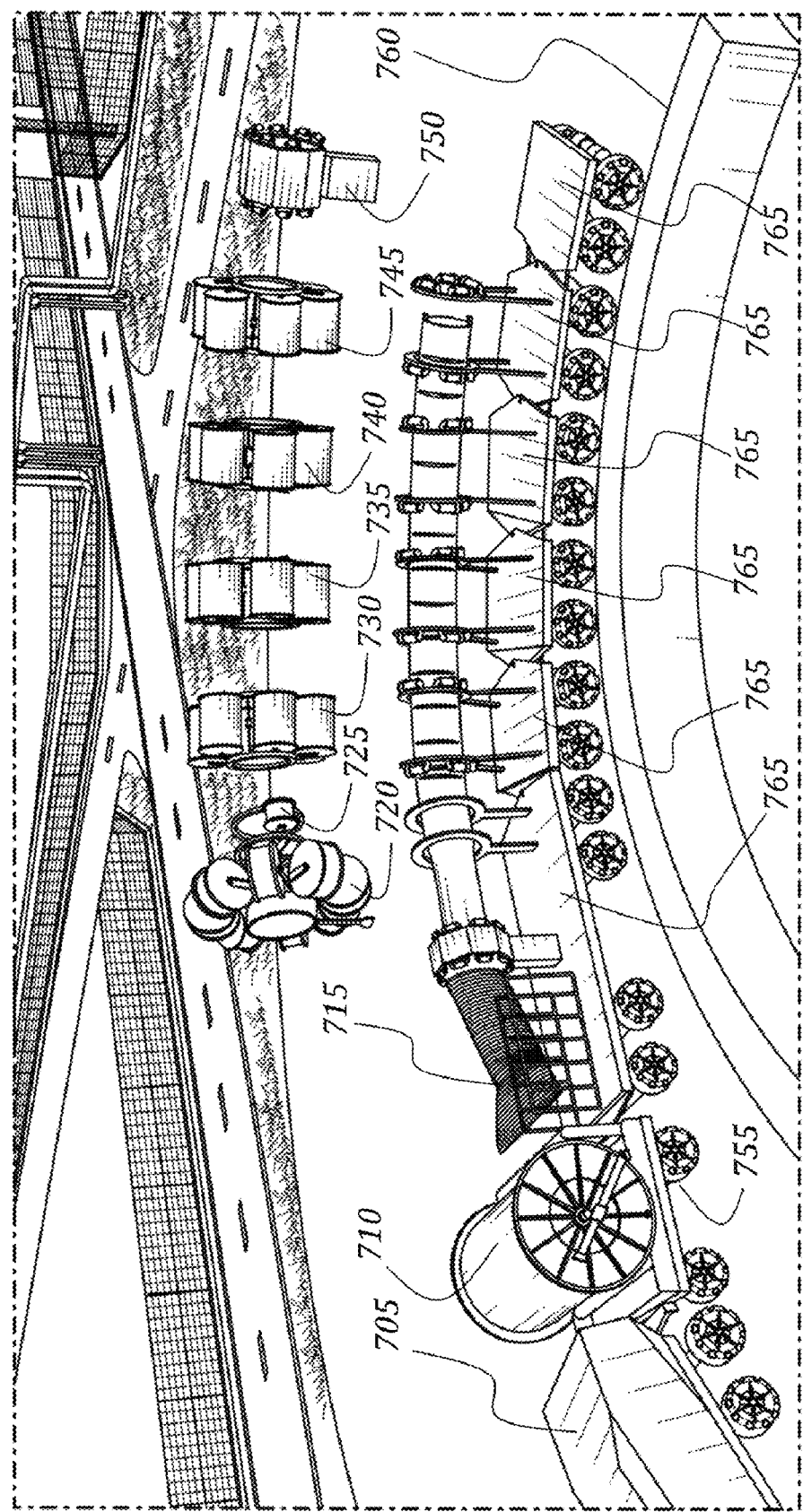
FIG. 7 depicts an exploded view of the AMV (705) drive unit (710) spool for sealing layer (715) sealing layer in the process of forming in the shaper mechanism (720) spool for axial reinforcement layer (725) spool for sensor wire (730) (735)(740)(745) spools for hoop reinforcement layers (750) autoclave (755) mecanum wheel bogie (760) inner wall (765) segment platform.
Figure 8:
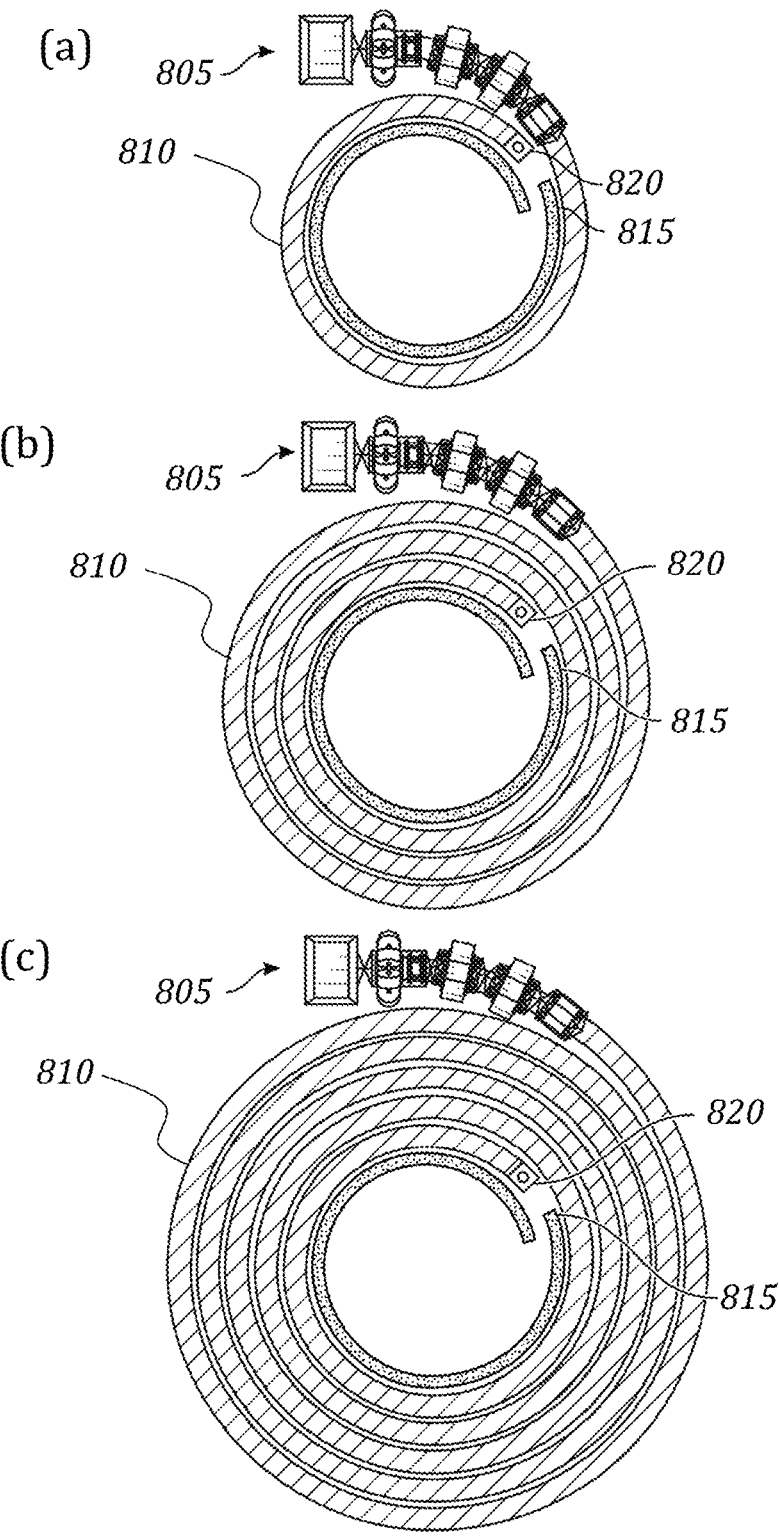
FIG. 8 depicts successive steps in the manufacture of a single-segment helical coiled-tube ITC (805) AMV (810) ITC (815) inner wall (820) terminus.
Figure 9:
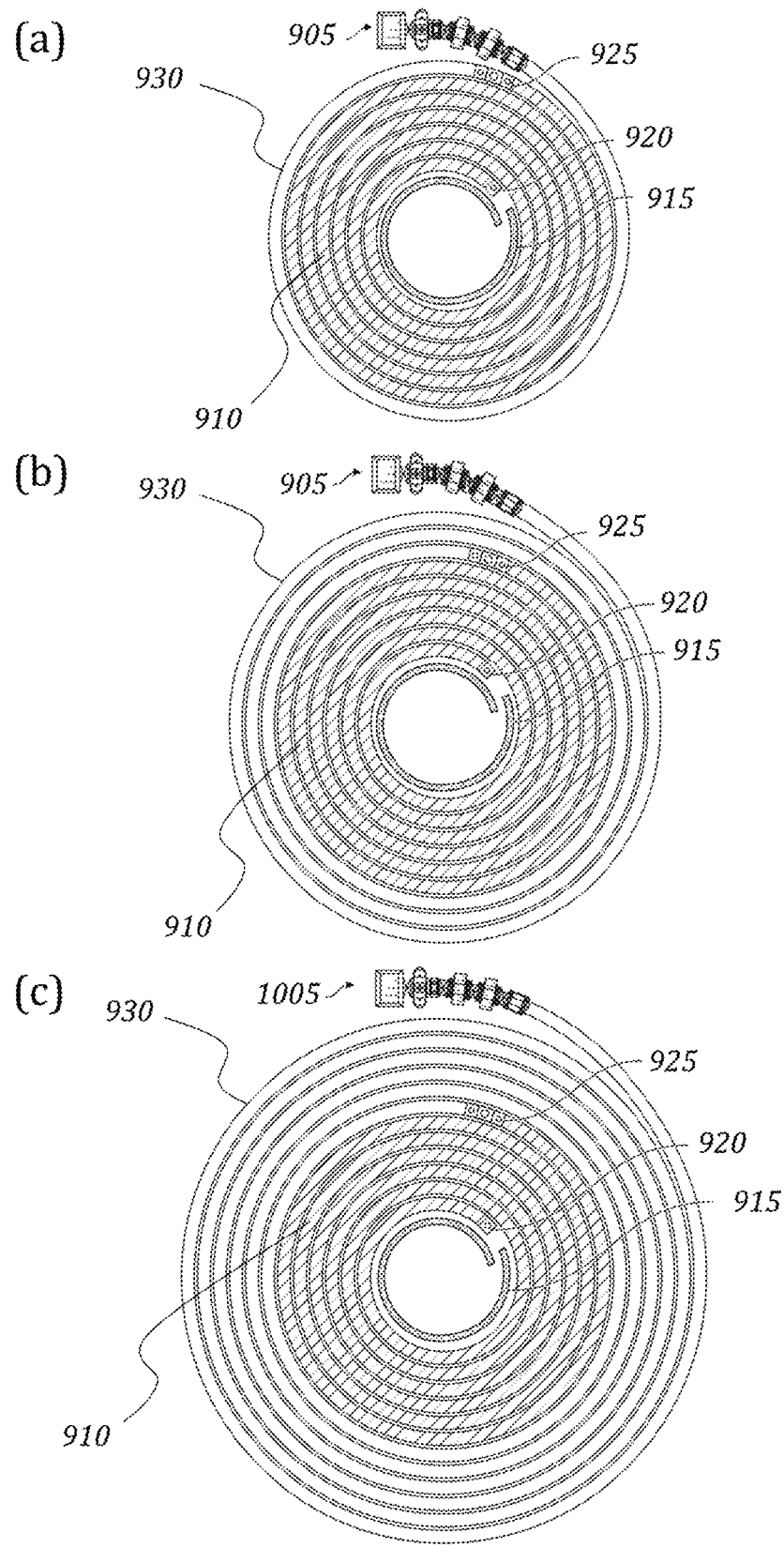
FIG. 9 depicts successive steps in the manufacture of a two-segment helical coiled-tube ITC (905) AMV (910) first segment of ITC (915) inner wall (920) terminus (925) isolation valve (930) second segment of ITC.
Figure 10:
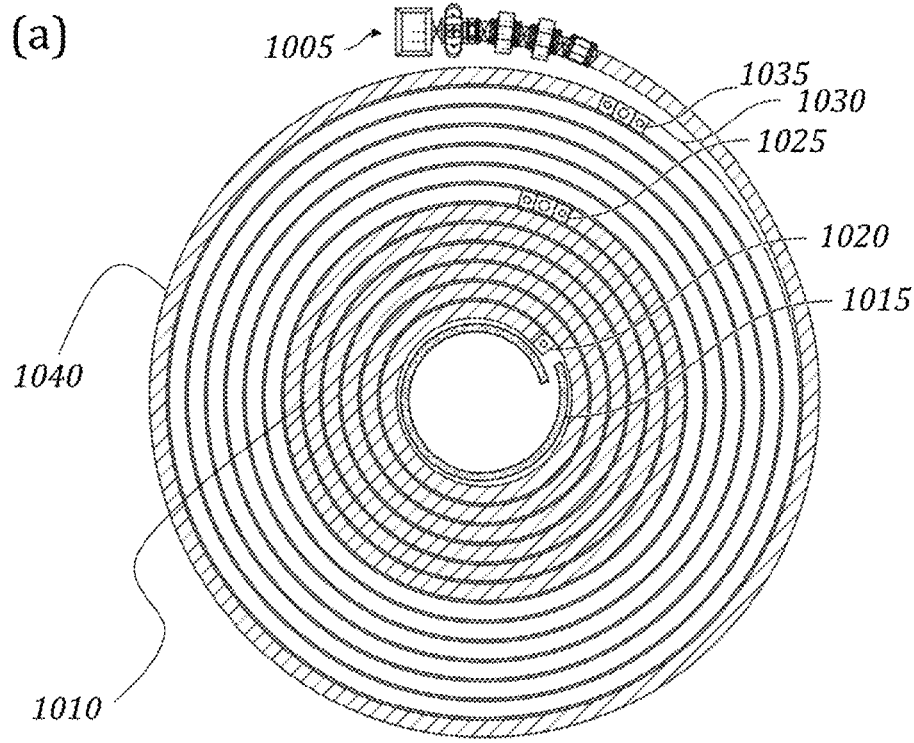
FIG. 10 depicts successive steps in the manufacture of a two-segment helical coiled-tube ITC (1005) AMV (1010) first segment of ITC (1015) inner wall (1020) terminus (1025) first isolation valve (1030) second segment of ITC (1035) second isolation valve (1040) third segment of ITC.
Figure 10:
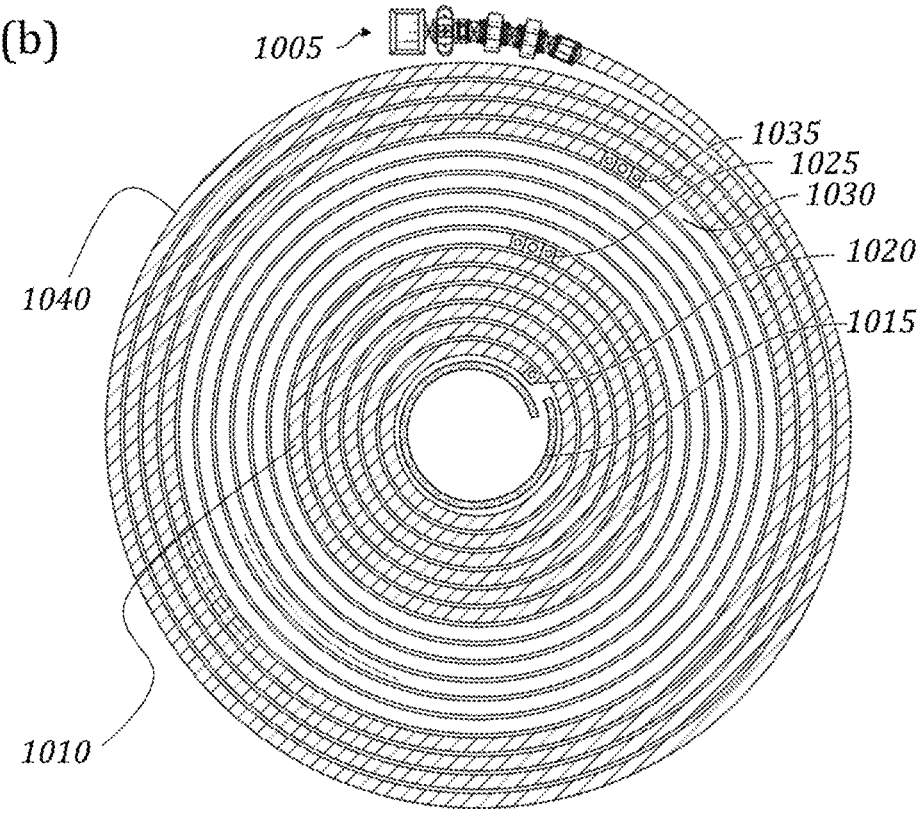

Provided herein, in an exemplary embodiment, is an innervated tubular composite ("ITC"), comprising one or more of the following assembly of concentric tubes, from innermost surface to outermost surface:
 (a) a sealing layer,
 (b) an axial reinforcement layer,
 (c) one or more hoop reinforcement layers,
 (d) an optional mesh-filled annulus, and
 (e) a protective layer;
 each assembly optionally further comprising a sensor array layer; and
 the innervated tubular composite further comprising an interspatial annular cylinder between each adjacent assembly of concentric tubes.

Also provided herein, in an exemplary embodiment, is a coiled innervated tubular composite ("ITC"), comprising one or more of the following assembly of concentric tubes, from innermost surface to outermost surface:
 (a) a sealing layer,
 (b) an axial reinforcement layer,
 (c1) a first hoop reinforcement layer,
 (c2) a second hoop reinforcement layer,
 (d) an optional mesh-filled annulus, and
 (e) a protective layer;
 the second hoop reinforcement layer wound with the opposite handedness as the first hoop reinforcement layer;
 each layer or assembly optionally further comprising a sensor array layer; and
 the innervated tubular composite further comprising an interspatial annular cylinder between each adjacent assembly of concentric tubes.

In some embodiments, the first and second hoop reinforcement layers will be wound with opposite handedness.

In some embodiments, at least one axial reinforcement layer contains a sensor wire. In some embodiments, at least one hoop reinforcement layer contains a sensor wire. In some embodiments, the sensor wire is a Pd- or Pd-alloy coated tapered optical fiber.

In some embodiments, the ITC is curved. In some embodiments, the ITC forms a coil. In some embodiments, the ITC forms a coil having constant radius of curvature. In some embodiments, the ITC forms a coil having smoothly varying radius of curvature. In some embodiments, the ITC forms a spiral. In some embodiments, adjacent loops of the structure in the spiral are substantially in contact.

In some embodiments, at least one of the layers in the one or more assemblies is intrinsically curved at one or more locations in the assembly. In some embodiments, at least one of the layers in the one or more assemblies is intrinsically curved throughout the assembly.

In some embodiments, the ITC consists of 1 assembly of the aforementioned tubes. In some embodiments, the ITC consists of 2 assemblies of the aforementioned tubes.

Also provided herein, in an exemplary embodiment, is a mono-innervated tubular composite ("MITC"), comprising the following concentric tubes, from innermost surface to outermost surface:
 (a) a sealing layer,
 (b) an axial reinforcement layer,
 (c) one or more hoop reinforcement layers,
 (d) an optional mesh-filled annulus, and
 (e) a protective layer,
 the mono-cannular composite optionally further comprising one or more sensor array layers.

Also provided herein, in an exemplary embodiment, is a mono-innervated tubular composite ("MITC"), comprising the following concentric tubes, from innermost surface to outermost surface:
 (a) a sealing layer,
 (b) an axial reinforcement layer,
 (c1) a first hoop reinforcement layer,
 (c2) a second hoop reinforcement layer,
 (d) an optional mesh-filled annulus, and
 (e) a protective layer,
 the second hoop reinforcement layer wound with the opposite handedness as the first hoop reinforcement layer; and
 the mono-cannular composite optionally further comprising one or more sensor array layers.

In some embodiments, the MITC is curved. In some embodiments, the MITC forms a coil. In some embodiments, the MITC forms a coil having constant radius of curvature. In some embodiments, the MITC forms a coil having smoothly varying radius of curvature.

In some embodiments, at least one of the layers in the MITC is intrinsically curved.

In some embodiments, one or more of the assembly of concentric tubes in any of the foregoing ITC comprises:
(d) a mesh-filled annulus.

In some embodiments, all of the assembly of concentric tubes in any of the foregoing ITC comprise:
(d) a mesh-filled annulus.

Also provided herein, in an exemplary embodiment, is a binary innervated tubular composite ("BITC"), comprising the following concentric tubes, from innermost surface to outermost surface:
(a) a first sealing layer,
(b) a first axial reinforcement layer,
(c) a first hoop reinforcement layer,
(d) an optional first mesh-filled annulus,
(e) a first protective layer,
(f) an interspatial annular cylinder,
(g) a second sealing layer,
(h) a second axial reinforcement layer,
(i) a second hoop reinforcement layer, and
(j) an optional second mesh-filled annulus, and
(k) a second protective layer;
the binary cannular composite optionally further comprising one or more sensor array layers.

In some embodiments, the BITC is curved. In some embodiments, the BITC forms a coil.

In some embodiments, the ITC forms a coil having constant radius of curvature. In some embodiments, the BITC forms a coil having smoothly varying radius of curvature.

In some embodiments, at least one of the layers in 2 assemblies is intrinsically curved.

In some embodiments, the BITC comprises:
(d) a first mesh-filled annulus.

In some embodiments, the BITC comprises:
(j) a second mesh-filled annulus.

In some embodiments, the intrinsic curvature in the at least one layer is uniform down the length of the structure. In some embodiments, the intrinsic curvature in the at least one layer is non-uniform down the length of the structure. In some embodiments, the intrinsic curvature in the at least one layer increases along the length of the structure.

In some embodiments, the intrinsic curvature in the at least one layer is such that the structure, in the absence of external force, assumes a coiled structure of uniform radius of curvature. In some embodiments, the intrinsic curvature in the at least one layer is such that the structure, in the absence of external force, assumes a coiled structure of non-uniform radius of curvature. In some embodiments, the intrinsic curvature in the at least one layer is such that the structure, in the absence of external force, assumes a spiral geometry. In some embodiments, the intrinsic curvature in the at least one layer is such that the structure, in the absence of external force, assumes a spiral geometry. In some embodiments, adjacent loops of the structure are substantially in contact with neighboring loops.

In some embodiments, the sealing layer is made from plastic sheet materials. In some embodiments, the sealing layer is made from a material chosen from plastic, modified thermoplastic, virgin thermoplastic, polymer, fluoropolymer, and polycarbonate. In some embodiments, the sealing layer is made from a recycled material. In some embodiments, the sealing layer is made from a bio-based material. In some embodiments, the sealing layer is made from a material chosen from ABS, PE, HDPE, UHMWPE, Nylon, PEEK, PET, PSS, PDA, PLA, PLLA, PPL, ETFE, polycarbonate, and polyurethane. In some embodiments, the sealing layer is made from a material chosen from reinforced PEEK or nylon. In some embodiments, the sealing layer has been radially etched.

In some embodiments, the axial reinforcement layer is made from a material chosen from aramid fiber, preferably para-aramid fiber, unidirectional and or bidirectional fiberglass, carbon fiber, Kevlar, or HDPE fabric. In some embodiments, the axial reinforcement layer is made from a material chosen from para-aramid fiber, unidirectional fiberglass, carbon fiber, Kevlar, or HDPE fabric with or without a pre-impregnated material chosen from epoxy, polyurethane, polyolefin, and EVA.

In some embodiments, the axial reinforcement layer comprises micro-ropes. In some embodiments, the axial reinforcement layer comprises micro-ropes made from one or more of carbon fiber, carbon fiber graphene hybrid, Kevlar, fiberglass, para-aramid, or polyethylene. In some embodiments, the axial reinforcement comprises carbon fiber micro-ropes or carbon fiber graphene hybrid micro-ropes. In some embodiments, the axial reinforcement layer comprises carbon fiber micro-ropes fabricated out of carbon fiber tow or carbon fiber graphene materials. In some embodiments, the micro-ropes are twisted or braided. In some embodiments, the micro-ropes are twisted or braided into filaments. In some embodiments, the axial reinforcement layer comprises twisted carbon fiber tow or twisted carbon fiber graphene hybrid micro-ropes. In some embodiments, the axial reinforcement layer comprises unidirectional carbon fiber, glass fiber, Kevlar, para-aramid, or polyethylene fibers. In some embodiments, the micro-rope filaments are bonded to each other. In some embodiments, the micro-rope filaments contain 2-80 individual twisted micro-ropes affixed together. In some embodiments, the micro-rope filaments are bonded to each other with EVA or a similar resin. In some embodiments, the micro-rope filaments are bonded to each other with EVA resin. In some embodiments, nanocomposites are incorporated into the resin to provide increased strength and permeation resistance.

In some embodiments, the hoop reinforcement layer comprises micro-ropes. In some embodiments, the hoop reinforcement layer comprises micro-ropes made from one or more of carbon fiber, carbon fiber graphene hybrid, Kevlar, fiberglass, para-aramid, or polyethylene. In some embodiments, the hoop reinforcement comprises carbon fiber micro-ropes or carbon fiber graphene hybrid micro-ropes. In some embodiments, the hoop reinforcement layer comprises carbon fiber micro-ropes fabricated out of carbon fiber tow or carbon fiber graphene materials. In some embodiments, the micro-ropes are twisted or braided. In some embodiments, the micro-ropes are twisted or braided into filaments. In some embodiments, the hoop reinforcement layer comprises twisted carbon fiber tow or twisted carbon fiber graphene hybrid micro-ropes. In some embodiments, the hoop reinforcement layer comprises unidirectional carbon fiber, glass fiber, Kevlar, aramid, preferably para-aramid, or polyethylene fibers. In some embodiments, the micro-rope filaments are bonded to each other. In some embodiments, the micro-rope filaments contain 2-80 individual twisted micro-ropes affixed together. In some embodiments, the micro-rope filaments are bonded to each other with EVA or a similar resin. In some embodiments, the micro-rope filaments are bonded to each other with EVA resin. In some embodiments, nanocomposites are incorporated into the resin to provide increased strength and permeation resistance.

In some embodiments, a cannular assembly in an ITC contains one or two hoop reinforcement layers. In some embodiments, adjacent hoop layers are wound with the opposite handedness. In some embodiments, cannular assemblies in an ITC contain one or two hoop reinforcement layers. In some embodiments, a cannular assembly in an ITC contains one hoop reinforcement layer. In some embodiments, cannular assemblies in an ITC contain one hoop reinforcement layer.

In some embodiments, the mesh-filled annulus comprises tape. In some embodiments, the tape is flexible in the longitudinal direction. In some embodiments, the tape is rigid. In some embodiments, the tape is resistant to compression. In some embodiments, the mesh-filled annulus further comprises a liquid or a cured resin. In some embodiments, the liquid or cured resin comprises a compound that reacts with a gas, thereby producing or releasing an odorant. In some embodiments, the gas is hydrogen.

In some embodiments, the protective layer is a fiber reinforced plastic. In some embodiments, the protective layer is a high slip material. In some embodiments, the protective layer is impregnated with a high-slip coating. In some embodiments, the protective layer is reinforced with aramid fabric, preferably para-aramid fabric. In some embodiments, the protective layer is an abrasion resistant material. In some embodiments, the protective layer comprises a material chosen from nylon, tear-resistant PTFE coated fiberglass fabric, and polyethylene. In some embodiments, the protective layer further comprises a polyolefin. In some embodiments, the composition of the protective layer promotes shrinkage and compression upon heating. In some embodiments, the protective layer is compressed after application. In some embodiments, the protective layer is compressed after application using heat. In some embodiments, the protective layer is compressed after application, thereby immobilizing one or more components below the protective layer. In some embodiments, the protective layer is compressed after application, thereby immobilizing a sensor array layer below the sealing layer.

In some embodiments, the protective layer is an over-mold layer. In some embodiments, the over-mold layer is spray-applied. In some embodiments, the over-mold layer comprises one or more materials chosen from bidirectional carbon fiber, Kevlar, fiberglass, UHMWPE, and graphene/diamine. In some embodiments, the carbon fiber is impregnated with resin. In some embodiments, the resin is curable or cured. In some embodiments, the resin comprises a white pigment. In some embodiments, the resin comprises a white titanium-based pigment.

In some embodiments, the over-mold layer further comprises a compound for leak detection. In some embodiments, the compound for leak detection changes color on exposure to a gas. In some embodiments, the gas is chosen from hydrogen, natural gas, and natural gas/hydrogen mixtures. In some embodiments, the magnitude of the color change varies depending on any one of the flow, proximity, and concentration of the gas.

Forming Mandrel

Also provided herein, in an exemplary embodiment, is a cantilevered forming mandrel for the manufacture of an innervated tubular composite.

In some embodiments, the mandrel is monolithic. In some embodiments, the mandrel comprises a plurality of segments positioned successively from the supported, upstream end to the unsupported, downstream end. In some embodiments, the segments are substantially cylindrical in shape.

In some embodiments, the mandrel is substantially linear. In some embodiments, the mandrel is substantially curved. In some embodiments, the curvature of the mandrel can be varied. In some embodiments, the mandrel can be varied between curved geometries of different radii of curvature. In some embodiments, the mandrel can be varied between curved geometries of different radii of curvature during manufacture of the ITC. In some embodiments, the mandrel can be varied between linear and curved.

In some embodiments, the exterior of the mandrel is substantially cylindrical in shape. In some embodiments, the exterior of the mandrel is substantially the shape of toroidal segment.

In some embodiments, the mandrel is solid or, alternatively, is composed of solid segments.

In some embodiments, the mandrel is hollow or, alternatively, is composed of hollow segments.

In some embodiments, the mandrel comprises one or more augers affixed to the mandrel. The augers can be driven by motors located in the interior of the mandrel, and can assist with moving the ITC downstream on the mandrel. The augers can be metal for structural strength and rigidity. In some embodiments, the one or more augers can be centrifugally retracted to a position at or interior to the OD of the mandrel, thereby allowing unimpeded passage of the ITC without contact or obstruction by the one or more augers. In some embodiments, the one or more augers can be centrifugally extended to make contact with the ID of the thermoplastic cylinder on the interior of the ITC. The contact area for the auger to the ID of the thermoplastic cylinder can comprise a material such as soft rubber in order to grip the thermoplastic and propel it forward. The power and control lines for the one or augers and other fixtures on the mandrel, such as heating units, can pass through the center of the mandrel.

In some embodiments, one or more pairs of adjacent segments in a segmented mandrel is connected with hinges. In further embodiments, all pairs of adjacent segments are connected with hinges.

In some embodiments, the hinges allow the individual segments in each pair of adjacent segments to translate and/or rotate relative to each other. In some embodiments, the hinges allow the individual segments in each pair of adjacent segments to translate and/or rotate relative to each other in the horizontal plane. In some embodiments, the hinges allow the individual segments in each pair of adjacent segments to rotate relative to each other in the horizontal plane.

In some embodiments, one or more pairs of the adjacent segments that are connected with hinges are further fitted with machinery to drive the translation and/or rotational motion.

In some embodiments, all of the pairs of adjacent segments that are connected with hinges are further fitted with machinery to drive the translation and/or rotational motion.

In some embodiments, none of the pairs of adjacent segments that are connected with hinges are further fitted with machinery to drive the translation and/or rotational motion.

In some embodiments, the mandrel further comprises spray coating equipment at its unsupported, downstream end.

In some embodiments, the interior of a mandrel further comprises one or more pipes. In some embodiments, the interior of a mandrel further comprises one or more wires. In some embodiments, the interior of a mandrel further comprises one or more optical fibers.

AMV

Also disclosed herein is an Autonomous Manufacturing Vehicle ("AMV"), comprising a means for manufacturing the innervated tubular composite. The AMV contains a cantilevered forming mandrel as disclosed herein. The AMV contains a station for the formation of the innermost, cylindrical, sealing layer from flat feedstock The AMV also contains a plurality of additional stations downstream (i.e., towards the unsupported end of the mandrel), for the stepwise application of individual layers on the growing ITC. The AMV comprises a station for application of the axial layer. The AMV comprises one or more stations for application of one or more hoop reinforcement layers. The AMV comprises a station for application of the protective layer.

In certain embodiments, the AMV is housed in a customized intermodal container. In certain embodiments, the AMV can be loaded onto a flatbed truck. In certain embodiments, the AMV can be loaded onto a barge.

In certain embodiments, the AMV comprises a means for fashioning a sealing layer from flat thermoplastic sheet feedstock.

Also provided herein is an AMV which directs the manufactured ITC downward into a sub-terra bore-hole.

The AMV contains independently pivoting segments, on each of which a station for manufacture of a layer of the innervated tubular composite can be mounted.

In some embodiments, each segment on the AMV is independently supported by a bogie of wheels. In some embodiments, the wheels are mecanum wheels. In some embodiments, the bogie of wheels on one or more segments can be steered independently. In some embodiments, the bogie of wheels on one or more segments can be propelled independently.

In some embodiments, the AMV contains one or more sensor components. In some embodiments, the one or more sensor components are independently chosen from lidar, proximity sensors, GNSS, and GPS. In some embodiments, a sensor component can provide position information. In some embodiments, the position information is chosen from latitude, longitude, and elevation. In some embodiments, the position information is chosen from latitude and longitude. In some embodiments, a sensor component can provide orientation information. In some embodiments, the orientation information is chosen from one or more of pitch, roll, and yaw. In some embodiments, a sensor component can provide mapping information. In some embodiments, the mapping information is surface contours.

In some embodiments, the AMV contains one or more navigation components. In some embodiments, the one or more navigation components are independently chosen from controllers, software systems, artificial intelligence (AI), machine learning (ML), and computer vision (CV). In some embodiments, a software system is capable of performing one or more of AI, ML, CV, dynamic motion algorithms, and 3D modelling.

In some embodiments, the AMV contains one or more actuator components. In some embodiments, the one or more actuator components are chosen from electric, pneumatic, and hydraulic actuators. In some embodiments, an actuator component can affect the position of the AMV. In some embodiments, an actuator component can affect the position of a segment of the AMV. In some embodiments, an actuator component can affect the orientation of the AMV. In some embodiments, an actuator component can affect the orientation of a segment of the AMV.

Methods of Manufacture

Also provided herein, in an exemplary embodiment, is a method for manufacturing an innervated tubular composite comprising two or more concentric, cylindrical layers, the method comprising the steps of:
  providing a mechanical forming mandrel having a fixed, upstream end and a cantilevered, downstream end;
  forming a first circular leading end of a first cylindrical layer from a first feedstock on the surface of the mandrel at a first location near the fixed end;
  advancing the first circular leading end towards the cantilevered end;
  fabricating a growing first cylindrical layer from a feedstock on the surface of the mandrel behind the advancing first circular leading end, the first cylindrical layer thereby advancing with the first circular leading end towards the cantilevered end and becoming the outermost layer of a growing innervated tubular composite;
  performing three or more iterations of the following steps:
    forming a new circular leading end of a new cylindrical layer from a new feedstock, which may be the same or different from other feedstocks, on the outer surface of the advancing outermost layer of the incomplete innervated tubular composite at a downstream location, the existing outermost layer thereby becoming an inner layer of the growing innervated tubular composite;
    fabricating a growing new cylindrical layer from the new feedstock on the outer surface of the advancing outermost layer behind the advancing new circular leading end, the new cylindrical layer thereby advancing with the inner layers towards the cantilevered end and becoming the new outermost layer of the growing innervated tubular composite;
  optionally coating the outermost layer of the growing innervated tubular composite;
  severing, as needed, the growing innervated tubular composite from the feedstocks; and
  separating the completed innervated tubular composite from the cantilevered end, thereby providing the innervated tubular composite.

In some embodiments, the fabrication process is automated. In some embodiments, the mandrel is linear. In some embodiments, the mandrel is curved. In some embodiments, the mandrel is monolithic. In some embodiments, the mandrel is articulable. In some embodiments, the geometry of the articulable mandrel is adjustable. In some embodiments, the geometry of the adjustable, articulable mandrel is automated. In some embodiments, the radius of curvature of the mandrel is amendable. In some embodiments, the OD of the mandrel is adjustable. In some embodiments, adjustment of the OD of the mandrel is automated.

In some embodiments, one or more of the feedstocks is a plastic material. In some embodiments, the plastic material is chosen from ABS, PE, HDPE, UHMWPE, Nylon, PEEK, PET, PSS, PDA, PLA, PLLA, PPL, ETFE, polycarbonate, and polyurethane. In some embodiments, the plastic material is a polyolefin, including but not limited to polyethylene, polypropylene, LDPE, HDPE, and UHMWPE. In some embodiments, the plastic material may incorporate an impermeable material. In some embodiments, the plastic material may incorporate a substance chosen from a nanocomposite, including a clay-based nanocomposite, and adhered coatings, including graphene, graphene oxide or graphite.

In some embodiments, the method further comprises the step of applying a coating to a surface of the innervated tubular composite. The coating may be applied to the internal surface, the external surface, or both, and the coatings on either surface may be the same or different. The coating may be applied post extrusion. In some embodiments, a titanium coating is applied to the external surface, in order to also provide resistance to ultraviolet radiation. In some embodiments, two or more coatings are applied on one surface or both surfaces. By way of example, the two or more coatings may include a clay-based nanocomposite and a graphene, graphene oxide, or graphite-based coating.

In some embodiments, the method comprises the step of incorporating curvature in at least one of the cylindrical layers concurrent with the manufacture of the at least one cylindrical layer.

Also provided herein, in an exemplary embodiment, is a coiled innervated tubular composite as disclosed herein, manufactured by a process as disclosed herein. In some embodiments, the process comprises the step of incorporating curvature in at least one of the layers concurrent with the manufacture of the at least one layer.

In some embodiments, the curvature that is incorporated in the at least one layer is constant down the length of the layer. In some embodiments, the curvature that is incorporated in the at least one layer varies down the length of the layer.

In some embodiments, the curvature that is incorporated in the at least one layer varies continuously down the length of the layer. In some embodiments, the curvature that is incorporated in the at least one layer increases proceeding down the length of the layer. In some embodiments, the curvature that is incorporated in the at least one layer decreases proceeding down the length of the layer. In some embodiments, the curvature that is incorporated in the at least one layer smoothly increases proceeding down the length of the layer. In some embodiments, the curvature that is incorporated in the at least one layer smoothly decreases proceeding down the length of the layer. In some embodiments, the curvature that is incorporated in the at least one layer is such that the structure, in the absence of external force, assumes a spiral geometry. In some embodiments, the curvature that is incorporated in the at least one layer is such that the structure, in the absence of external force, assumes a spiral geometry in which adjacent loops of the structure are substantially in contact with neighboring loops.

Methods of Storage

Also disclosed herein, in an exemplary embodiment, is a method for storing gaseous or liquid media, the method comprising the step of introducing the material into an innervated tubular composite as disclosed herein.

Also disclosed herein are methods for storing media, the methods comprising the steps of:
  providing a sub-terra bore-hole in the ground and/or bedrock; and
  inserting an ITC, as described herein, into the borehole.

In certain embodiments, the ITC is chosen from a single ITC or a binary ITC. In certain embodiments, the radius of the ITC is between 8 inches and 12 feet. In certain embodiments, the borehole is substantially vertical. In certain embodiments, the borehole is substantially linear. In certain embodiments, the ITC extends to a depth of up to 20,000 feet. In certain embodiments, the ITC extends to a depth of up to 10,000 feet. In certain embodiments, the ITC extends to a depth of up to 5,000 feet. In certain embodiments, the ITC extends to a depth of up to 2,000 feet.

Abbreviations

ABS=acrylonitrile butadiene styrene plastic; AI=artificial intelligence; AMV=Autonomous Manufacturing Vehicle; BTCS=binary cannular composite structure; CV=computer vision; ETFE=Ethylene tetrafluoroethylene; FAME=fatty acid methyl ester; GNSS=Global Navigation Satellite System; GPS=Global Positioning System; ID=inner diameter=inside diameter; MIG=metal inert gas welding; ML=machine learning; MOF=mobile onsite factory; OD=outer diameter=outside diameter; PDA=poly(diacetylene); PE=polyethylene; UHMWPE=ultra high molecular weight polyethylene; HDPE=high density polyethylene; LDPE=low density polyethylene; PEEK=Polyether ether ketone; PLA=poly(lactic acid); PLLA=poly(L-lactic acid); PPL=poly(polypropiolactone); PSS=poly(styrene sulfonate); SMAW=shielded metal arc welding; TCS=cannular composite structure; TDC=track drive carrier; TIG=tungsten inert gas welding; UHMWPE=Ultrahigh-molecular-weight polyethylene; UT=ultrasonic.

Definitions

The term "annulus", as used herein, alone or in combination, refers to a region between two concentric circles. The term "annular cylinder", as used herein, alone or in combination, refers to a region between two concentric cylinders. The term "interspatial annular cylinder", as used herein, alone or in combination, refers to an empty region between two concentric cylinders. In some embodiments, the interspatial annular cylinder can be filled with a liquid. In some embodiments, the liquid within an interspatial annular cylinder can then be cured, to form a solid, gel, or semi-solid.

The term "concentric", as used herein, alone or in combination, refers to two circular or cannular structures which share approximately the same center. The term "concentric" will also refer to two tubes which share approximately the same center, both of which tubes then form a coiled geometry.

The term "cylinder", as used herein, refers to the standard geometric definition of a prism with a circle at its base. It will be appreciated that some of the articles of manufacture described herein may be susceptible to forces, e.g., gravity, which distort the ideal cylindrical shape. The term "cylinder", as used herein, will also cover these articles of manufacture.

The term "cannular assembly", as used herein, alone or in combination, refers to an assembly of concentric tubes. In some embodiments, a cannular assembly comprises, from innermost surface to outermost surface: (b) an axial reinforcement layer, and (c) one or more hoop reinforcement layers. In some embodiments, a cannular assembly comprises, from innermost surface to outermost surface: (a) a sealing layer, (b) an axial reinforcement layer, and (c) one or more hoop reinforcement layers. In some embodiments, a cannular assembly comprises, from innermost surface to outermost surface: (b) an axial reinforcement layer, (c) one or more hoop reinforcement layers, and (d) a protective layer. In some embodiments, a cannular assembly comprises, from innermost surface to outermost surface: (a) a sealing layer, (b) an axial reinforcement layer, (c) one or more hoop reinforcement layers, and (d) a protective layer. In some embodiments, a cannular assembly further comprises one or more sensor array layers. In some embodiments, the axial layer in a cannular assembly comprises a Pd- or Pd-alloy coated tapered optical fiber. In some embodiments, one or more hoop reinforcement layers in a cannular assembly comprises a Pd- or Pd-alloy coated tapered optical fiber.

The term "innervated tubular composite" ("ITC"), as used herein, alone or in combination, refers to a structure containing one or more concentric cannular assemblies. In some embodiments, the ITC contains 1, 2, 3, 4, or 5 concentric cannular assemblies. The cannular assemblies may be the same or different. In some embodiments, the innervated tubular composite comprises one or more interspatial annular cylinders between adjacent cannular assemblies.

The term "coiled-tube structure", as used herein, alone or in combination, refers to a coiled innervated tubular composite.

The term "binary innervated tubular composite" ("BITC"), alone or in combination, refers to a structure containing 2 concentric cannular assemblies. The cannular assemblies may be the same or different. In some embodiments, the innervated tubular composite comprises an interspatial annular cylinder between the two cannular assemblies.

The term "intrinsic curvature", as used herein, alone or in combination, refers to an article of manufacture which, in the absence of external force, assumes a curved geometry. The term is therefore intended to include an article of manufacture whose manufacture comprised a step of introducing curvature concurrent with manufacture. The term is therefore intended to exclude an article of manufacture whose manufacture comprises a step of introducing curvature into a non-curved precursor of the article. The term is also therefore intended to exclude an article of manufacture whose manufacture comprises a step of increasing the curvature, i.e., decreasing the radius of curvature, into a less-curved precursor of the article (i.e., having a smaller radius of curvature).

The terms "pitch", "roll", and "yaw", as used herein, have their standard meanings as used, for example, in aviation. The direction of the advancing growing innervated tubular composite can be considered as the forward direction.

The term "radius of curvature", as used herein, alone or in combination, refers to the radius of a circle whose curvature best approximates the curvature at a particular location on an arc.

The term "wire", as used herein, alone or in combination, refers to a means for transmitting either information or electrical current over distance. The term therefore encompasses traditional wire based on copper, aluminum, or other conducting metal. The term therefore also encompasses fibers for the transmission of information without electrical current, and thus encompasses optical fibers.

Innervated Tubular Composite ("ITC")

The innervated tubular composites disclosed herein offer major improvements over current and lesser cannular storage facilities, including those in tanks and caverns. The innervated tubular composite can be manufactured with a continuous manner via methods described herein. The resulting continuous cannular structure significantly reduces the requirements for butt joint splicing, bell and spigot or mechanical couplers as it the case with current off the shelf cylinder material methodologies. In contrast, current available storage systems require connection of off the shelf pipes with fusion welds, wedge welds, metal welds, or flanges. These connections are the most vulnerable areas in the structure to fatigue, corrosion, embrittlement, and rupture as they are unreinforced and realize a great portion of the strain concentration imposed by internal fluid or gas pressure. For this reason, these current systems require significantly thicker walls, adding to expense and weight and significantly reducing flexibility. The continuous nature of the innervated tubular composites disclosed herein, whose manufacture does not require connection of individual pipes, circumvents these problems.

Utilization of flat thermoplastic sheet feedstock materials by the methods and manufactures disclosed herein represents a significant improvement over current technology. There are also significantly reduced handling costs, and carbon emissions with the manufactures as describe herein. This is due to the minimal requirement to unload and place only one spool of material onsite as opposed to unloading, placement and the continued placement of individual sections of pipe. These pipe sections need to be constantly moved from the laydown area to near the installation access for butt welding, thus also significantly increasing the costs as well as carbon emissions from the heavy equipment required for this significant material handling process. Furthermore, the methods as described herein can ultimately produce an innervated tubular composite that is significantly lighter than steel or HDPE prefabricated cannular structures. For example, a representative 10" pipe manufactured out of steel would weigh approximately 64 lb./ft. and one manufactured out of HDPE would weigh approximately 15 lb./ft. as compared to the composite cannular structure disclosed herein, which weighs approximately 2.7 lb./ft. While this structure realizes a factor of more 4× in reduced weight, this same structure can resist as much as 30×the internal pressure, compared to the other materials. These significant reductions in both weight and weight-to-strength ratio drastically reduce the impact of material shipping, handling, and fabrication while also reducing the carbon emissions created in their manufacture, shipping, handling, and fabrication processes.

The utilization of flat plastic sheet feedstock for these methods described herein also allows for the improvement of using thinner flat stock materials for onsite manufacturing, as compared to current methods that utilize and connect prefabricated pipe sections. Current methods can utilize only the nominal thicknesses and lengths that are available in the "off the shelf" marketplace. Additionally, since these methodologies only utilize one monolithic or continuous thickness/layer of material for sealing and watertightness, hoop resistance (internal pressure load) and bucking resistance (soil/hydrostatic load), their structural design requires considerably thick walls to meet these design considerations.

The use of rolled plastic flat sheet stock for this methods described herein, coupled with the methodology of inserting or over molding a second ITC into or over a first ITC as part of or during the manufacturing and/or installation process, achieves both the cohesive and cumulative thickness and resistance of the sealing layers and the cohesive strength and structural enhancement of the post installation flowable materials as required by the structural design, while at the same time utilizing thinner watertight materials in each sealing layer. Furthermore, the design of the system is a significant improvement over current technologies, in that the design highly mitigates the tension or hoop stresses imposed on the sealing layer. The innervated tubular composite is unlike the materials and methods described above such as HDPE pipe, PVC, CIPP etc. where the sealing of watertight layer or composition is required to resist all internal and external loads as well as maintain watertightness. The sealing layer or water-tightness component of the ITC is constrained by the hoop reinforcement layer, thus significantly diluting the hoop or tension stresses applied to the material. Due to the ITC design, the sealing layer material will be under compression, and not tension, when the cannular structure is subjected to internal pressure.

Again, this is a major improvement over current pipe storage methodologies as it allows utilization of nearly any thermoplastic material for the sealing layer, affording significantly increased design life and versatility.

Preferably, the innervated tubular composite structure contains one or means for sensing the structural integrity of the structure, thereby providing advance warning to the operator of leakage from or failure of the structure. The means may consist of one or more sensor array layers. The means may consist of one or more Pd- or Pd-alloy coated tapered optical fibers.

Coiled Innervated Tubular Composite

An elaboration of the innervated tubular composite is the coiled innervated tubular composites, which incorporates curvature.

In some embodiments, the radius of curvature of the coiled innervated tubular composite is constant for the entire length of the layer. This can provide spring-shaped coiled innervated tubular composites, for which the final radius of curvature is constant throughout.

In some embodiments, the radius of curvature of the coiled innervated tubular composite varies along its length. This can provide spiral-shaped coiled innervated tubular composites, which are preferable over spring-shaped structures for their compactness, and for which the radius of curvature smoothly increases as the spiral progresses outward.

The coiled innervated tubular composites disclosed herein will necessarily require incorporation of curvature, either before or after manufacture. When a cannular structure is fabricated in straight-line fashion, the unidirectional axial and hoop reinforcement material lengths are finite and equal to the overall linear length or the cumulative circumferential measure of the cannular structure respectively. Typically, axial reinforcement is applied in designated axial (longitudinal) orientations around the circumference of the cannular structure to resist all axial stresses created when the structure is subjected to internal pressure and any tensile stresses from pulling the structure. However, this resistance loses efficacy if the cannular structure deviates from a straight-line orientation. Hoop reinforcement is applied in designated radial or hoop orientations around the circumference of the cannular structure to resist all radial or hoop stresses created when the structure is subjected to internal pressure. Again, however, this resistance loses efficacy if the cannular structure deviates from a straight-line orientation. When a cannular structure that is manufactured in a straight-line arrangement and then subsequently manipulated into a bent, curved or sweep orientation, the structural integrity of the applied bidirectional, unidirectional, axial, and hoop fiber reinforcement is substantially reduced. Applying curvature of the cannular structure post-manufacture leads to a severe reduction of structural integrity due to one or more of: intensified tension, compression, relaxation, deformation, misalignment, or separation, dependent on the materials and attachment processes. The extent of this loss of structural integrity increases dramatically with increased distortion of the originally linear cannular structure into a curved shape.

Multi-layer structures, such as those disclosed herein, can be particularly vulnerable to incorporation of curvature after manufacture. Individual layers may be incorporated for reasons other than structural integrity; however, for a structure distorted from an initially linear configuration, each layer must be able to withstand the particular stress and strain at that location. Stated differently, for such a structure, resistance to deformation must be incorporated into every single layer, and not just one or a small number of layers.

This factor is particularly important for the various sensor layers, and especially the optical sensor fibers. Due to their nature, these sensor fibers are particularly fragile and susceptible to breakage on slight distortion of the structure. Incorporation of curvature concurrent with manufacture would circumvent the risk of breaking these fibers after their inclusion into the ITC.

The significant integrity reduction in reinforcement materials upon manipulation into curved or bent shapes post-manufacture further jeopardizes the structural design performance and safety of the cannular structure. Design engineers utilize specific considerations for calculating the predictive pressure rating (pressure resistance) of a cannular structure. If this design is completed for a cannular structure based on straight-line orientation manufacturing and then the cannular structure is manipulated into a curved, bent or sweep orientation the structural design is no longer valid, and the pressure rating design of the cannular structure is compromised or even negated depending on the severity of the radius bend. To solve these listed issues inherent in current methods of reinforcing cannular structures with fiber reinforcement, most generally they are manufactured with bidirectional reinforcement. This bidirectional reinforcement fabric has fibers or strands oriented in both the axial and radial orientations in a weave such as with hydraulic or pneumatic hoses. This type of bidirectional fabric lessens the effect of reduced structural integrity when the cannular structure is manipulated into a curved or radius arrangement as the hoop and axial reinforcement fibers are intertwined and in proximity. The design and engineering drawback with utilizing bidirectional reinforcement instead of individually oriented axial and hoop fibers as with the innervated tubular composites disclosed herein, is that there is an intrinsic and significant reduction of initial mechanical properties of the reinforcement material due to its design. Subsequently, when utilized for straight-line cannular structures there still is a reduction in structural integrity when the structure is manipulated into a radius. This known reduction of integrity must then be "built in" to the design calculus. Bidirectional reinforcement material has diminished pressure restraining properties, compared to individual unidirectional reinforcement fibers oriented in the axial and radial directions.

One of the main causes of diminished reinforcement with bidirectional orientation is that the individual fibers in the bidirectional matrix become misaligned during installation. This inherent misalignment is recognized in the art. In order to meet the required pressure rating and safety factors, current methodologies utilize as much as 5× more bidirectional material for reinforcement around cannular structures, as compared to utilization of individual unidirectional reinforcement fibers. This creates inherent issues such as significantly increased cost and manufacturing time, as well as resulting in a cannular structure that has significantly increased stiffness due to the multitude of layers required. The completed cannular structure in this case is then not easily manipulated into a curved or radius arrangement as is required for the coiled innervated tubular composites disclosed herein. To match the structural integrity or pressure rating of individual unidirectional reinforcement with bidirectional reinforcement application the cannular structure would achieve a stiffness near to that of steel.

For at least the aforementioned reasons, the coiled innervated tubular composites disclosed herein, in which the curvature is deliberately and intentionally incorporated in the structure during manufacture, rather than introduced post-manufacture by distortion of an originally linear structure, represents an advance over current technologies. The innervated tubular composite is manufactured in permanence with the precise radius and arrangement of unmanipulated reinforcement.

Sealing Layers

The sealing layers are functional layers installed and located on the innermost surface of each cannular assembly in the innervated tubular composite. The sealing layers provide watertightness, and act as a redundant leak safeguard and for increasing the buckling resistance in the final cohesive composite structure.

Since the hoop reinforcement layer, described below, provides exterior reinforcement of the sealing layer, outward strain applied to the sealing layer due to internal fluid or gas pressurization during service the sealing layer is completely constrained from causing separation, damage, or rupture by the hoop reinforcement layer. The sealing layer material is therefore only subjected to compression, to which it has a high resistance. This design parameter ensures that any short term, long-term or transient loading on the sealing layer material and the seam is far below the material's physical properties thus eliminating any potential for separation, creep, cracking or rupture as well as significantly mitigating long term material fatigue.

The sealing layers can provide an impermeable barrier to the material stored within the innervated tubular composite, and can be made from materials with specific resistance and non-adherence to the media being stored in the structure. Embodiments containing one or more cannular assemblies, each assembly containing a sealing layer on its innermost surface, are contemplated in this disclosure, depending on the required pressure resistance and/or the required number and types of flowable, and optionally curable, materials in the interspatial annular cylinder. The most internal sealing layer may also be constructed of materials that are highly hydrophobic or oleophobic to allow for the release of media when cleaning or batching different media to significantly reduce FAME and contaminants.

Individual sealing layers on different cannular assemblies can be made from different materials. Sealing layers can be made from plastic sheet materials. By way of example only, the plastic sheet material can be chosen from ABS, PE, HDPE, UHMWPE, Nylon, PEEK, PET, PSS, PDA, ETFE polycarbonate, and polyurethane. By way of example only, the plastic sheet material for hydrogen transmission may be traditional or recycled and modified PET or Bio-based with polymeric nanocomposite with an organo-modified clay additive or graphene/graphene oxide or graphene derivatives. In certain embodiments, thinner fiber reinforced flat sheet feedstock material such as reinforced PEEK or Nylon or similar that has been pre-etched radially for corrugation or radially etched can be employed. Methods disclosed herein may utilize highly reinforced plastics and metal sheet stock. Material for the sealing layer in the innermost cannular structure of the ITC may be chosen based on one or more of the following variables: cost, non-adherence, chemical or erosion resistance to the transmitted pipeline media, modulus for buckling resistance, and (when applicable) heat resistance to the application of cold spray metalizing and thermal processes or resistance to the pipeline media. Unlike current and lesser methods, and in consideration of the flat sheet feedstock methodology utilized in the materials and methods disclosed herein, the ability to utilize any material composition affords the capability to also utilize recycled plastics and bio-based materials, which will significantly reduce the overall carbon footprint of the manufactures, their manufacture and the installation equipment and methodologies disclosed herein.

While the methods and manufactures disclosed herein retain the capability to use traditional petroleum polymerization derived materials such as HDPE or a hybrid of these traditional materials and recycled or bio-based materials, they can also utilize a high fraction of recycled, bio-based, and low emission materials. In some embodiments, recycled, bio-based, and low emission materials constitute 50% or more of the materials used in a method or manufacture. In some embodiments, recycled, bio-based, and low emission materials constitute 75% or more of the materials used in a method or manufacture. In some embodiments, recycled, bio-based, and low emission materials constitute 90% or more of the materials used in a method or manufacture.

By way of example, recycled, bio-based, and low emission materials that may be used in the methods and materials disclosed herein may include recycled materials such as polyethylene terephthalate (PET) plastic, including PET from recycled water bottles and other PET and similar recycled plastics and products. Additionally, bio-based materials that may be used in the methods and materials disclosed herein may include but are not limited to: PLA homopolymers (polylactic acid) and variants, such as PLLA, PPLA or "green" high density polyethylene. Many of these augmented bio-based and recycled materials have high dimensional stability, impact, moisture, alcohol and solvent resistance and often higher mechanical properties than their traditional petroleum-based counterparts. This makes them ideal for utilization in these innervated tubular composites disclosed herein, and in turn be part of solution for carbon reducing and carbon neutral technologies. By example, the efficacy of carbon reductions made possible by the methods and manufactures disclosed herein, in only one mile of 12-inch diameter of ITC the entire structure ITC would utilize the recycled materials from nearly 3.5 million-12-ounce plastic water bottles or the sequestering of 20 tons of carbon dioxide in its manufacture. It should be noted again that, by design, all past and current storage systems cannot utilize these low carbon emission materials due to the "off the shelf" prefabricated cylinders or pipes that are used as the foundation of the processes, with recycled and bio-based compositions not being commercially available.

Tow Material and Micro-Rope

The innervated tubular composites disclosed herein can comprise micro-ropes. In some embodiments, the micro-ropes are made from one or more of carbon fiber, carbon fiber graphene hybrid, Kevlar, fiberglass, aramid, preferably para-aramid, or polyethylene. In some embodiments, the micro-ropes are made from carbon fiber or carbon fiber graphene hybrid. In some embodiments, the innervated tubular composites disclosed herein can comprise thermoplastic and carbon fiber, carbon fiber/graphene, UHMWPE or other aramid and natural fiber reinforcement micro-rope filaments, making the resulting structure as much as 20× lighter than steel pipe while providing the structure with as much as 15× the internal pressure rating as that of steel pipe.

Certain methods and articles of manufacture disclosed herein utilize micro-ropes composed of tow material. Use of micro-rope reinforcement filaments can significantly increase the breaking efficiency of reinforcement material filaments produced from premanufactured tow materials.

The breaking efficiency of these tows, tapes or filaments with axially aligned threads is comparatively low to that of the micro-rope orientation disclosed herein. Standard tow materials have as few as 2,000 and as many as 72,000 individual in-line threads, positioned next to each other to produce a tape or filament used for the reinforcement of structures and parts. When this tow is placed under tension, the individual threads, each oriented differently, are subject to different tension. Due to this lack of alignment of the threads in the standard tow, as tension is increased at or above the breaking strength of an individual thread, some of the threads, in certain orientations, begin to break, while other threads, in the same tow but oriented differently, have yet to be subjected to the breaking tension. The cumulative result is that threads in the tow break at different intervals, which results in reduction of the overall strength of the tow. Stated differently, the lack of alignment of threads in a standard tow results in non-optimal breaking efficiency.

The claimed micro-rope embodiment of the present invention utilizes a non-standard tow material, in which the orientation of the individual threads is much more uniform, and thus more favorable. The tow material is impregnated with a flexible EVA or similar resin prior to formation of the micro-rope. These micro-rope filaments typically contain 2-80 individual twisted micro-ropes made from material tows of 2 k to 600 k and are affixed together and be between 0.25 inches and 20 inches wide and approximately 0.30 inches and 1 inch in thickness. The ratio of reinforcement material:EVA resin typically ranges from 60:40 to 95:5. The tow material, carbon fiber, fiberglass, etc. is then placed under specific design torsion to twist the tow material, thus placing each individual thread in the tow under torsion and tension, thereby aligning the threads axially during this torsion process. Once these twisted tows reach the specific torsion, they are heated to cure the EVA resin, which serves to maintain the torsion and orientation of the threads in the twist. These individual twists are then axially aligned next to each other to produce varying widths of filaments, and are then bonded together by heating, and then cooling, the EVA resin. The resulting filament is a series of twisted tow filaments (micro-ropes) in widths from 0.25" to 60".

In some embodiments, nanocomposites are incorporated into the EVA or similar resin to provide increased strength and permeation resistance.

Due to the prior alignment and tensioning of the individual reinforcement threads, when the micro-rope filaments are placed under tension, the individual reinforcement threads in this filament are subjected to a much more uniform tension than are standard tow or bidirectional reinforcement materials. This significantly increases the breaking efficiency of the filament, and thereby increases the overall tensile and breaking strength of the filament over that of standard tow reinforcement filaments. The use of the micro-rope reinforcement orientation facilitates much higher overall strength to weight ratio of the reinforcement materials, thus reducing the reinforcement material required to provide a specified level of internal pressure resistance.

Axial Reinforcement Layers

The axial reinforcement layers are functional layers, applied to the OD of the sealing layer in one or each cannular assembly in the ITC, imparting axial reinforcement and strength to the ITC to resist axial loading created by internal pressure.

The axial reinforcement layers can be made of any material that provides the required reinforcement. Individual axial reinforcement layers on different cannular assemblies can be made from different materials. By way of example only, the material can be chosen from para-aramid fiber, unidirectional fiberglass, carbon fiber, Kevlar, or HDPE fabric with or without pre-impregnated materials, such as epoxy, polyurethane, polyolefin, and EVA.

One or more of the axial reinforcement layers in an ITC may incorporate a sensor wire disclosed below, including but not limited to a Pd- or Pd-alloy coated tapered optical fiber.

Most generally, the axial reinforcement layer will be made of individual twisted or braided carbon fiber micro-ropes or twisted or braided carbon fiber graphene hybrid micro-ropes aligned sequentially into filaments and bonded to each other with EVA or similar resin. The micro-ropes can be fabricated out of carbon fiber tow or carbon fiber graphene materials from 5 k to 600 k which are twisted to a specific torsion and orientation to increase the alignment and the subsequent strength of the micro-rope and subsequently the filament by assuring each strand is subjected uniformly when under strain. These micro-rope filaments can be bonded together longitudinally with EVA resin to create a sheet fabric. These micro-rope filaments can be bonded together to form a filament or tape. This filament or tape can be uniformly distributed along the axis of the structure. The micro-ropes can comprise the EVA-impregnated material described above. The micro-ropes can be bonded together to form a filament or tape. Preferentially, for the curved ITC, filaments of this micro-rope material will be employed.

Hoop Reinforcement Layers

The hoop reinforcement layers of the innervated tubular composite are functional reinforcement layers applied helically to encircle the axial reinforcement layer for providing high resistance to hoop stresses created in the innervated tubular composite from internal pressure. This layer most typically will be made from twisted carbon fiber tow or twisted carbon fiber graphene hybrid (micro-ropes); however, unidirectional carbon fiber or glass fiber, Kevlar, aramid, preferably para-aramid, or polyethylene fibers can be used as an iteration of this embodiment. The hoop reinforcement layer is wound over the axial reinforcement layer by way of external winders with storage spools. For applications that require additional hoop reinforcement, more than one hoop reinforcement layer can be incorporated into a cannular assembly. The more than one hoop reinforcement layers can be located adjacent or non-adjacent to each other. Preferably, a pair of hoop reinforcement layers located adjacent to each other will be wound with opposite handedness, e.g., one layer will be wound with a left-handed helix and the other layer will be wound with a right-handed helix.

One or more of the hoop reinforcement layers in an ITC may incorporate a sensor wire disclosed below, including but not limited to a Pd- or Pd-alloy coated tapered optical fiber.

Sensor Array Layers

The sensor array layers are one or more optional functional layers embedded within the ITC that can provide data acquisition capabilities for instantaneously reporting changes in, for example, temperature, pressure, flow, tension, fatigue, wall thickness, and/or corrosion, as well as other acoustic indicators such as movement like seismic events and approaching third-party activities. The embedded sensor array can provide continuous monitoring of the innervated tubular composite for structural health.

This sensor array layer most generally will consist of optical fibers for acoustic communication of data for the identification, classification, and overall health monitoring of the cannular structure while in service. The sensor array layer can be composed of optical fibers, communication cable, temperature, gas, and vibration sensors, chemical reaction sensors, and gas chromatography-mass spectrometry etc. for a variety of gas and liquid transmitted media.

The sensor array layer can utilize discrete acoustic sensing devices combined with AI and ML classification and localization frameworks that allow for development of pattern recognition schemes for infrastructure security, faults, leaks, ruptures etc. The AI and ML fusion platform can afford remote simulated finite element analysis of the entire structure in real time for monitoring the health of the entire system.

In some embodiments, a sensor array layer is embedded on the exterior of a hoop reinforcement layer. In some embodiments, a sensor array layer is embedded on the exterior of an axial reinforcement layer. In some embodiments, a sensor array layer is located on the interior surface of a protective layer. In some embodiments, a sensor array layer is located on the exterior surface of the sealing layer.

The present disclosure contemplates innervated tubular composites containing zero or one sensor array layers in each cannular assembly. A binary innervated tubular composite may therefore contain zero, one, or two sensor array layers. In some embodiments, the innervated tubular composite contains a sensor array layer in the innermost cannular assembly, intended for monitoring events within the structure, such as leakage of the contents. In some embodiments, the innervated tubular composite contains a sensor array layer in the outermost cannular assembly, intended for monitoring events outside of the structure, such as seismic events and third-party activities.

Depending on application type and the existence of potentially hazardous conditions of effluent or area, an ITC that comprises a sensor array, spiraled sensors fibers, embedded fibers can provide comprehensive data to the operator. The sensor array layer disclosed herein is an intelligent and proactive system as it is embedded within the redundant leak and failure safeguards that are intrinsic to the innervated tubular composite. This allows for increased surface area of the sensors and exacting data and feedback associated with the pipeline media. In some embodiments, the system utilizes an embedded artificial intelligence, affording high speed or even real time data computation for feedback systems. A significant advantage of the known AI computational capabilities is affording exact location and specific event data, allowing the system to either manually or autonomously enact proper event control such as valve actuations. By comparison, data acquisition systems for current systems are reactive, in that an event might be reported to the operator only after a failure or leak has already taken place. In such circumstances, the ability to circumvent, e.g., an explosive event, is very limited. Many current and lesser storage systems do not possess redundant or any leak/failure safeguards, as they are a single sealing layer cylinder without interspatial containment—if the sealing layer fails anywhere in the system, there is a potential for a catastrophic environmental and/or human safety event. Conversely, with the methods for proactive data acquisition disclosed herein, early notification to the operator of a pending potential failure event, combined with the intrinsic redundant leak safeguards for containment of the potential leak, allows a much longer interval for thorough data analysis and execution of any necessary preventative action. Thus, early warning of potential failure, combined with robust leak mitigation, highly reduce the potential for catastrophic environmental or explosive events.

Sensor Wires

The reinforcement materials in the innervated tubular composite also may contain an embedded sensor wire for facilitating additional monitoring and interrogation capabilities of the appointed cannular structure.

In some embodiments, the innervated tubular composite contains at least one sensor wire. In some embodiments, the sensor wire is embedded in an axial reinforcement layer. In some embodiments, the sensor wire is embedded in a reinforcement layer that comprises micro-rope. In some embodiments, the sensor wire is embedded in concave valleys formed between micro-ropes.

In some embodiments, the sensor wire will consist of a tapered optical fiber coated with Pd or a Pd alloy for detecting leaked hydrogen due to internal or external damage. These optical Pd fibers may be a single optical cable or may be embedded into the reinforcement fabrics of the composite cannular structure. Palladium has a high and selective affinity for hydrogen, and experiences a volumetric expansion that that is roughly proportional to hydrogen concentration. This hydrogenation of Pd not only induces a physical strain on the optical fiber but also changes the electronic configuration, resulting in a change in refractive index which can be monitored. Tapered optical fiber coated with Pd or a Pd alloy such as Pd/Ti improves safety by providing early notification of potentially dangerous concentrations of hydrogen. In some embodiments, concentrations of less than 100 ppm can be detected, allowing for leak remediation and/or isolation long before the lower explosive limit (LEL) is ever reached. Furthermore, sensors based on Pd-coated tapered optical fibers afford fast reporting times of less than 30 seconds, and by using Pd alloys, this can be reduced to less than 10 seconds.

Protective Layers

The protective layer is a functional layer applied on the exterior of the hoop reinforcement layer to provide protection of sensor array layer as well as all interior layers during the installation process. In one embodiment, this layer can be made of fiber reinforced high strength materials with high slip and abrasion resistant properties, including but not limited to nylon, tear-resistant PTFE coated fiberglass fabric, and polyethylene, depending on the application. The layer can be reinforced with aramid fabric, preferably para-aramid fabric. The layer can be impregnated with a high-slip coating. Inclusion of polyolefin or like compounds in a formulated composition can promote thermal shrinkage and compression of the protective layer during manufacture.

Alternatively, the protective layer may consist of an over-mold layer. The over-mold layer may consist of a material chosen from carbon fiber, Kevlar, aramid, preferably para-aramid, and fiberglass fabric. In some embodiments, the material may be impregnated with a UV or heat cured resin.

Terminations

For the coiled-tube structure, mechanical fittings can be used on the innervated tubular composites to seal these terminations while also facilitating the connection to other pipe system for filling, evacuating, venting, and stabilizing of the structure. At the opposing end of the ITC, a mechanical seal with injection ports is aligned to the interspatial annular cylinders and affixed to the structure OD.

Interspatial Annular Cylinders/Flowable Material

In an exemplary embodiment, all interspatial annular cylinders down the length of the cannular structure are filled with a flowable, and optionally curable, material for cohesion, increased buckling resistance, strain shielding, exterior void filling/pipe stabilization and redundant leak safeguards.

Upon full cure, the flowable and curable resin in the external interspatial annular cylinder can provide critical functionality. This cured material possesses a consistency of that of ballistic gel throughout its design life. This low Poisson's ratio cured material suspends the ITC in its appointed site, thereby shielding and absorbing the transference of strain from, e.g., seismic events. The cured material layer can also afford flexibility, allowing the ITC to move slightly axially and radially between terminations even under high internal pressure loading without damaging or fatiguing the ITC. This effect minimizes the risk of ITC failure due to transient axial loading, unexpected deformations, or bending or failure events of the structure due to soil cycling or seismic events.

In the absence of the gelatin material, the interface between the ITC and the appointed site is nearly cohesive when the pipe is pressurized, due to friction. With suspension of the lining composite in this structure, this situation is remedied. Even under internal pressure, the gelatin material has enough flexibility to create a differential in interlaminate stresses. The gelatin material, even when compressed, will still allow for extensional, transformational, and compressional movement of the pipe different than that applied to the structural composite materials in the ITC system.

The benefits of the gelatin will hold true for perforations, cracks (radial or longitudinal), beam bending (bending load), traverse shear events, seismic events etc. Additionally, the flowable and curable resin can be mixed with a material having an elevated pH composition, so as to fill and seal any existing pinholes or microcracks. This material can also inhibit internal and external corrosion and can mitigate further damage to the structure.

Certain innervated tubular composites utilize glass bubble insulation as a high ratio additive to the flowable material or utilized as the sole agent in the process. The glass bubble material provides a low viscosity such as that of water and results in and is manufactured specifically for a highly efficient insulation for the cryogenic transmission and storage of liquid nitrogen.

Certain innervated tubular composites disclosed herein are suitable for transmission or storage of liquid hydrogen, due to their long-term resistance to highly elevated internal pressures and increased safety and hydraulic capacity. Certain embodiments of these structures may therefore include insulating material in one or more interspatial annular cylinders, in order to mitigate boil-off. Certain further embodiments can incorporate a rigid material and glass bubble formulation within an interspatial annular cylinder, thereby providing even more insulative qualities to the structure.

Certain innervated tubular composites disclosed herein can incorporate an adhesive matrix of glass fiber, polymer fiber or carbon fiber from 100 to 300 microns in length on the outside surface. Certain methods of manufacture disclosed herein can include application of the adhesive matrix to the outside surface of the protective layer. This adhesive matrix will provide fiber orientation for improved strength and modulus of the flowable material when injected into the interspatial annular cylinder post installation. The adhesive matrix will permit the flowable material to flow through the interspatial annular cylinder to rejection, while at the same time adding increased structural integrity to the material once cured. In contrast to mixing the fibers into the materials prior to pumping, as is standard practice in exterior coatings and cement, application of the adhesive matrix permits the flowable material to retain its low viscosity for pressure injection. The provided increase in strength and modulus to the flowable material will offer an option to increase the buckling resistance of the innervated tubular composite system.

Mesh-Filled Annulus

In some embodiments, the innervated tubular composite includes a layer composed of a flexible mesh material tape with compressive resistance and rigidity. An additional radial winder apparatus can be used for application of this layer. This mesh material is highly flexible longitudinally and is wound radially around the innervated tubular composite during the onsite manufacturing process. This flexible mesh is applied immediately following the hoop reinforcement application and prior to the application of the final layer protective over-mold material. This compressively rigid mesh once applied affords a rigid substrate for the application of the over-mold as well as affording a mesh-filled annulus between the hoop reinforcement and the over-mold.

Injected Curable Resins and Non-Curable Liquids

In a further embodiment, the mesh-filled annulus allows for the injection of a pressurized curable resin or non-curable liquid into the annulus. In a further embodiment, the liquid flows through the mesh to fill the annulus in its entirety after the cannular structure installation is completed. The injected resin or liquid can provide the end user with options that are dependent on the application location and the gas being stored.

A benefit from the mesh-filled annulus is that injection and curing of flowable and curable resins within the annulus creates a highly reinforced layer—thus significantly increasing the buckling, hoop, and puncture resistance of this layer.

In a further embodiment, particularly for hydrogen storage applications, the mesh-filled annulus can be injected with substances that provide odorization of the hydrogen gas in the event of a leak in the cannular composite or at connection areas such as valves, caps, piping and couplers. Hydrogen is an odorless gas and is highly flammable when mixed with air. In the event of a leak, it would be undetectable creating a safety hazard. This contrasts with natural gas, which is generally mixed with a sulfur based mercaptan odorant whose "rotten egg" odor is readily detected by the human nose and sensors. However, these odorants cannot be mixed with hydrogen due to potentially hazardous reactions. Research firms are working feverishly to find an odorant formulation that can work successfully for hydrogen. Some of the main problems that have been encountered are: (a) chemical reactions between high purity hydrogen and the odorant; (b) physical effects on the storage vessel or pipeline, such as increased corrosion or other reactions with grid components; and (c) masking of the odorant's efficacy by hydrogen over time. Equally, with this present invention sulfur based mercaptan based odorants can be used, as the odorant need not be mixed with the hydrogen and can rather be located in a separate layer. This advantage allows for the use of odorants that have been proven effective in many years of their use thus not requiring the development of new odorants for hydrogen gas.

With this embodiment, odorization of hydrogen is made possible without the requirement that the odorant be mixed with the hydrogen, offering significantly safer options for odorization. Rather than be incorporated directly into the hydrogen, the odorant is incorporated into the liquid injected into the mesh-filled annulus. This liquid is not in contact with the hydrogen during storage, and only comes into contact with the hydrogen in the event of a leak—the exact reason that odorants are used. In the event of a leak in the innervated tubular composite from a micro crack, puncture, etc., the hydrogen would flow into the mesh-filled annulus prior to entering the outside atmosphere. As the hydrogen leaks through the mesh-filled annulus, it will contact the odorant and mix with its components, thereby providing a distinct and detectable odor to any hydrogen emitted into the outside atmosphere.

It will be recognized that a background flow of odorant into the atmosphere may occur, due to volatilization of the odorant and diffusion of vaporous odorant into the atmosphere. This background flow can be considered. In the event, the rate of transmission of odorant into the atmosphere will be substantially higher in the presence of an outward flow of hydrogen from the site of the leak.

Another advantage of this embodiment is that it reduces the cost of high purity hydrogen for the end user—there is no need to mix the hydrogen with odorants, and eliminates the safety hazards that accompany direct mixture of odorant with hydrogen.

Over-Mold

Methods disclosed herein can comprise application of an over-mold reinforcement layer during the manufacturing process. In certain embodiments, incorporation of over-mold reinforcement layers can provide additional reinforcement without the need for assembling concentric multiple innervated tubular composites. For example, these methods will be particularly useful for the coiled-tube structure, for which the innervated tubular composite is manufactured with a predetermined minimum radius of curvature. Insertion of a second ITC within a first, coiled ITC, may be difficult or impossible, due to non-linear friction or capstan effect. For this reason, incorporation of an over-mold can provide the reinforcement that would otherwise be gained by providing a binary ITC system.

In some embodiments, the over-mold comprises a bidirectional resin impregnated with any one of carbon fiber, Kevlar, fiberglass, UHMWPE, and graphene/diamine, or a combination of any or all, affording a filament tape suitable for winding. The liquid resin formulation utilized for the pre-impregnation and final curing/hardening of the over-mold material can be formulated with a titanium based white pigmentation for UV resistance.

The liquid resin formulation can also include a reactive agent specific to the gas being stored, including but not limited to hydrogen and natural gas. The reactive agent affords the end user with a significantly increased safety measure, made possible due to the capability to visually realize leak detection, accomplished by the human eye or through computer vision, AI or other visual sensing and communication systems for autonomous sensing of gaseous leak in the cannular structure. Reaction of the agent with leaked gas induces a color change in the resin. Without limitation, the color can change from white to black. The time of this reaction is based on the ambient temperature of the resin and the flow rate of the gas as it contacts the agent. In typical storage applications this reaction time will be less than 10 seconds.

In some embodiments, the color change is modulated by various factors, including but not limited to gas concentration, proximity of the agent to the leak, or the flow rate of the leak. Without limitation, the modulation can consist of a change in brightness or intensity of the color. By way of example, a darker hue can be generated at locations in close proximity to the leak, and lighter hues can be generated more distant from the leak. Modulation of the color, at one or several locations, can assist in localizing the leak by human or artificial sensory perception. This incremental reaction also allows inspection processes to pinpoint the exact area of the leak by analyzing the color modulation across a large surface area surrounding the leak and, in some circumstances, identifying the strongest color modulation at a location nearest to the leak.

The leak detection system provided by methods of storage disclosed herein offers several advantages over permanent or mobile leak sensing devices. Current leak detection devices, installed or used in proximity to the structure, sample the air in a region surrounding the structure. The region for air sampling may be at a significant distance from the structure, which risks disruption or error due to wind, rain, or other weather events. Furthermore, lingering foreign offsite gases can complicate measurement, leading to incorrect or inconclusive determinations or, in worst-case outcomes, lead to false negatives, with potentially catastrophic results. Because the measurements are highly dependent on local wind and weather conditions, these leak detection devices cannot easily pinpoint the exact location of the leak. Even in the case of gas concentration data from multiple sampling locations, the error introduced by location-specific variations in weather and wind will complicate efforts to map the data and thereby identify the leak location. Absent accurate and reliable information on the location of a leak, localization of the leak would then require expensive and time-consuming manual inspections.

The over-mold layer can also increase the buckling resistance and ring stiffness of the innervated tubular composite and provide puncture and perforation resistance of the cannular structure. The over-mold can also provide additional hoop strength which can afford higher pressure ratings and safety factors. The impregnation of the over-mold reinforcement fabric matrix with the curable resin and upon cure results in a layer with high tensile and flexural strength and modulus thus supplementing the overall strength and rigidity of the final cannular structure.

In another embodiment of the innervated tubular composite, this over-mold layer can also be spray applied.

In an exemplary embodiment, the innervated tubular composites disclosed herein have one or more cannular assemblies, with an optional interspatial annular cylinder between one or more pairs of adjacent cannular assemblies. In some embodiments, the innervated tubular composite comprises a minimum of one and a maximum of five cannular assemblies, with an interspatial annular cylinder between one or more pairs of adjacent cannular assemblies. In some embodiments, the innervated tubular composite comprises two cannular assemblies, with an optional interspatial annular cylinder between each pair of adjacent cannular assemblies. In some embodiments, the innervated tubular composite comprises one cannular assembly.

A representative embodiment of the innervated tubular composite includes the minimum of the following layers from innermost surface to outermost surface respectively:

1. a first sealing layer
2. a first axial reinforcement layer
3. a first hoop reinforcement layer
4. a sensor array layer
5. a protective layer
6. an interspatial annular cylinder
7. a second sealing layer
8. a second axial reinforcement layer
9. a second hoop reinforcement layer
10. a second protective layer
11. a second interspatial annular cylinder
    a. (optional) cold spray metalized, thermal or conventional protective coating layers on the internal and external surfaces of the innervated tubular composite.
    b. (optional) second sensor array layer In some embodiments, one or more axial reinforcement layers comprises a Pd- or Pd-alloy coated tapered optical wire. In some embodiments, one or more hoop reinforcement layers comprises a Pd- or Pd-alloy coated tapered optical wire.

Specialty Coatings

Also disclosed herein are materials and methodologies for applying specialty coatings, thermal and solid-state supersonic particle deposition onto any interior or exterior of the cannular structure. Methods described herein can provide traditional highly resistant thermoset coatings, thermal flame spray, austenitic metal and other metal coatings or films 360 degrees on the ID of the innermost sealing layer to protect the cannular assembly from contact with the transmission media. Methods described herein can provide traditional thermoset coatings, thermal coatings, and austenitic and other metal coatings or films 360 degrees to the OD of the protective layer to increase buckling resistance, bending resistance, fireproofing, insulation, and resistance to weather events and vandalism. Methods described herein can also provide a second sealing layer on the cannular structure followed by placement of reinforcement over the surface to provide a double wall innervated tubular composite. By way of example, for transport or containment of natural gas, natural gas/hydrogen, high purity hydrogen or liquid hydrogen, application of austenitic steel materials such as pure aluminum or nickel provides high resistance to long term hydrogen diffusion and embrittlement in high internal pressure pipeline systems as well as increased buckling and bending resistance to the composite structure. The cold spray process can be used for application of metalized powder at supersonic speed with the incorporation of heated gases such as nitrogen or helium to the inside surface of the sealing layer cylinder. The cold spray process allows for high purity aluminum or nickel or other metal powders to be applied radially at any thickness on the inside surface of the sealing layer. By way of example, application of a metal coating such as pure aluminum can afford long term resistance to diffusion of natural gas and hydrogen mixtures or to high purity hydrogen gas for high pressure transmission pipelines.

A similar process can be employed for ITC intended for the coiled-tube structure. In a first sequence, an ITC fabrication procedure would utilize a coating process to produce the sealing layer. In a second sequence, application of additional layers of axial and hoop reinforcement is applied to the ITC.

The application of metal films and coating also increase the buckling resistance of the sealing layer to future external or vacuum loading when lower modulus plastic materials are utilized for the sealing layer. The automated manufacturing process on the forming mandrel for the innervated tubular composite affords this structure the capability to install multiple heated gas, fluid and power supply wires or rigid conduits through the center of the mandrel to the application nozzles at end of the mandrel. The mounting of the nozzle array shall be in the proximity to the downstream end of the mandrel, where the completed ITC dismounts from the mandrel, and where the interior surface is fully exposed radially.

The external surface is exposed for the application of cold spray applied metalized linings, coatings, and films. This capability affords proximity of the cold spray supply equipment to the spray nozzles. More importantly this methodology affords the incorporation of multiple spray nozzles in a tight radial array. This provides overlapped and consistent material thickness deposition for a smooth surface profile without the requirement of a rotary spray nozzle as would be required in a remote spray applied system. The method overcomes the current numerous impediments that prevent achievement of reliable and repeatable capability of fully rotational application of known cold spray technologies or other coatings through the supersonic particle deposition or traditional means. Additionally, since the interior surface of the completed innervated tubular composite is no longer obstructed or constrained by the forming mandrel, the ITC can be autonomously clocked or rotated up to 120 degrees clockwise and counterclockwise directions. This ITC clocking capability can be interfaced in correlation and in synchronization with the nozzle orientations in the nozzle array. This improvement affords significantly increased surface coverage from fewer nozzles and more consistent coating thicknesses by spiraling the deposition patterns on the sealing layer surface. This also allows for more material flow to be supplied to the nozzles without the potential of poor or uneven surface profile and texture. It additionally significantly decreases the application time of the metalized material on the sealing layer. This inline longitudinal orientation of nozzle arrays with individual supply lines can afford a definitive increase in material flow and drastically reduced manufacturing and installation times of the innervated tubular composite.

Forming Mandrel

The forming mandrel is a pipe-like structure on which a cannular assembly is assembled. The forming mandrel is cantilevered, i.e., it is directly supported at only one end, allowing the cannular assembly, as it is being manufactured, to traverse the mandrel unhindered by supports. In some embodiments, additional support for the cannular assembly can be provided with rollers, track drives, or similar devices external to both the forming mandrel and the cannular assembly. These rollers, track drives, or similar devices can relieve, in part, the structural demands on the mandrel to maintain the cantilever. These devices can further be power driven, in order to move the growing cannular assembly downstream on the mandrel with a minimum of tensile stress. One or more augers affixed to the mandrel can also assist with moving the growing cannular assembly downstream.

Ancillary and affixed to the plurality of reinforcement application devices are the attachment of both static and dynamic rollers/track assemblies around the circumference of the application equipment near the articulating mandrel passage. These assemblies support and center the articulating mandrel as well as provide propulsion of the cannular structure over the mandrel during the manufacturing process. The compression of the roller assemblies on the cannular structure provides friction force to push and pull the cannular structure along the mandrel as well as to align and support the mandrel in the center of the application devices to assure proper alignment independent of curvature.

The sealing layer, once shaped into a cylinder and sealed, is drawn onto the mandrel. Preferentially, the OD of this tube is marginally smaller than the ID of the structure to be manufactured, allowing for the structure to slide along the mandrel axis during the onsite automated manufacturing process. In some embodiments, the diameter of the mandrel is adjustable, so as to meet the design requirements of a particular coiled-tube structure. In some embodiments, the diameter of the mandrel is adjustable during manufacture, in order to afford the preferred spiral geometry. The mandrel cantilevers through the various assemblies, such as spools and orbiting fixtures, for successively overlaying materials to the external of the growing cannular assembly. The completed cannular assembly eventually dismounts at the unsupported end. Upon completion of a suitable length, the innervated tubular composite is severed from the material upstream on the mandrel.

The end of the mandrel is affixed to an elevated mounting fixture at the location end where the manufacturing process begins. The remaining axial extension of the mandrel is then cantilevered through a plurality of winding and application devices and while unattached to these devices, is supported and aligned by the same so that the cannular structure being produced and reinforced can slide along the outer circumferential surface of the mandrel and progress forward along the mandrel's length and through the winding and application equipment.

In certain embodiments, the mandrel is substantially linear. The cannular assembly that is manufactured on such a mandrel can be expected to be substantially linear. In certain embodiments, the mandrel incorporates a curve. The cannular assembly that is manufactured on such a mandrel can be expected to incorporate a curve as well. Depending on the particular composition of an ITC, it will have a degree of flexibility; however, incorporation of a curve into a cannular assembly may be particularly useful for the coiled-tube structure, for which incorporation of an intrinsic curve into the ITC may be beneficial.

In certain embodiments, an entire monolithic mandrel, or alternatively each pivoting segment in an articulating mandrel, can be fitted with a heat source. In some embodiments, the heat source is chosen from resistance coils, electromagnetic induction units, and pipes containing warmed water or other liquid, any of which is preferably located in the interior of the mandrel. In some embodiments, the mandrel is fitted with a forced-air source, preferably external to the mandrel, capable of driving warmed air onto the mandrel.

In some embodiments, the mandrel is provided with sufficient heat to soften the an innermost thermoplastic sealing layer, thereby facilitating formation of curved geometries. Optionally, the temperature is maintained between 100° F. and 200° F. (optimally around 120° F.) during the production of the structure. In some embodiments, the temperature at various locations along the mandrel can be independently controlled.

Preferably, the temperature is sufficiently controlled so as not to overheat the thermoplastic. This control will be important in the case of thermoplastic sealing layers whose butt ends have been fusion welded. Overheating these fusion welds can cause the welds to weaken and separate. Precise control of the temperature at the mandrel will minimize this possibility.

In certain embodiments, the unsupported, downstream end mandrel can be fitted with a cooling source. In some embodiments, the cooling source comprises a heat exchanger. In some embodiments, the heat exchanger is fed with chilled water or other suitable liquid, including but not limited to refrigerant or antifreeze. In some embodiments, the mandrel is fitted with a forced-air source, preferably external to the mandrel, capable of driving cooled air onto the mandrel.

The traversing speed of the cannular structure along the forming mandrel is predetermined from the dimensions of the cannular assembly and the feedstock, as well as from the required amount of hoop and radial reinforcement and is adjusted to exactly meet the production speed of other processes, both upstream and downstream.

In some embodiments, intermittent tracked drive fixtures are placed between the winding and processing equipment. These tracked drive fixtures propel the cannular assembly along the mandrel from compression of the cannular assembly to the mandrel surface. The track drives are oriented in a circular configuration around the forming mandrel. When the cannular assembly is pulled into position on the mandrel and forward of the drive fixture, the drive fixture actuates electrically or pneumatically to compress the track drive belts against the surface of the cannular assembly. The drive fixtures can be speed controlled to precisely synchronize with the precise speed of the manufacturing process and the speed of the other drive fixtures, spools and pulling winch. This feature both provides propulsion of the cannular assembly along the forming mandrel as well as support for the forming mandrel. The track belts of drive fixtures can compress the cannular assembly in order to accept some of the load of the forming mandrel; however, due to drives being in axial motion the cannular assembly can continue to progress along the forming mandrel.

Various processing and quality control fixtures can be located on the forming mandrel for modifying the internal surface of the cannular assembly. These modifications can include, but are not limited to thermal spray seam overmolding, application of specialty coatings, and solid-state supersonic particle deposition, often referred to as the "cold spray" process. Various processing and quality control fixtures can also be located exterior to both the forming mandrel and the cannular assembly. Inline and radially oriented nozzle arrays can be located on the mandrel at the terminal end for spray application on the interior of the cannular assembly, with the feedstock for this spray application being provided by a centrally located and cantilevered supply conveyance conduit to affix and supply multiple inline and radially oriented nozzle arrays.

Nozzle arrays can also be located exterior to both the mandrel and the cannular assembly, for spray application to the exterior of the cannular assembly.

Additionally, a combined phase array flaw detection and thickness measurement sensors may be affixed and cantilevered forward of the nozzle arrays to provide real time flaw detection and thickness measurement of any coatings, linings or films applied to the sealing layer.

Articulating Mandrel

The articulating mandrel is an enhancement of the aforementioned mandrel, in that it allows for the manufacture of innervated tubular composites which are intrinsically curved, i.e., assume a curved geometry in the absence of external force. Furthermore, this inherent curvature can be varied in a smooth and controllable manner along the entire length of the structure, thus optimizing the structure for a coiled configuration.

In some embodiments, the articulating mandrel is made of several short straight sections connected to pivot joints, preferably made of thrust bearings or other types of bearing joints. These pivot joints allow each individual section of the mandrel to pivot and rotate around the joints.

Due to this articulated design, the radius of curvature of the mandrel can be altered during manufacture and radius. This alteration can be directed by embedded software to allow the innervated tubular composite to be manufactured with an autonomously amended bending radius to assure precise alignment, orientation, and engagement of all reinforcement materials in permanence for appointment to the surface.

In some embodiments, the mandrel can assume a linear configuration. The minimum radius of curvature for a particular mandrel will be determined by design characteristics and placement of the various components.

This functionality additionally assures the highest pressure rating obtainable and significantly increased pressure ratings over that of all current similar methods. More importantly, this assures that the reinforcement's placement, alignment, and orientation meet or exceed all engineering design and predictive design and pressure rating calculus for the structure's design life. Furthermore, it assures that the placement, alignment, and orientation of the reinforcement materials retain the optimized geometry after application, since the precise curvature required for proper alignment in the storage coil is incorporated into the cannular structure before it is appointed to the surface. This assures that the completed cannular structure being appointed from the mandrel to the surface will continually and precisely align with the curvature of the cannular structure previously appointed at the matching degree of curved orientation to the radius of the overall coiled-tube structure.

The precise positioning and leveling of the articulating segments which control the degree of the articulating mandrel radius can be controlled by embedded software systems which can utilize a fusion of AI, ML, CV, as well as a vast array of sensor components.

Autonomous Manufacturing Vehicle ("AMV")

The field installation of the innervated tubular composite can be completed with the utilization of an autonomous manufacturing vehicle ("AMV") which will significantly increase the effectiveness, efficiency, and precision of the manufactured ITC system. The mobility and versatility of the AMV allows its precise positioning to site for appointment. It can provide ITC installation in areas not accessible with current technology.

The AMV contains, most importantly, the forming mandrel. The growing innervated tubular composite will proceed down the mandrel, and laterally in the AMV, beginning with manufacture of the sealing layer. The AMV will preferably have a "conveyer-belt" configuration. Each successive cylindrical layer will have a dedicated station at a particular location on the mandrel, each containing one or more fixtures for manufacture of the layer. As the growing structure moves downstream on the mandrel and alongside the various stations, the structure is manufactured in layers, progressing from innermost to outermost.

Just as importantly, compared to current technologies, the AMV will afford the ITC installation process a substantially smaller jobsite and a significantly reduced carbon footprint. The AMV's automated manufacturing equipment can be permanently housed in a customized intermodal container to allow for the transporting of the mobile factory on a flatbed trailer to and from jobsites. The AMV can then be affixed to a track drive carrier (TDC) unit. The AMV and TDC units can be powered by rechargeable batteries for all drive train mechanics, steering systems, and hydraulic systems, and can possess solar power systems for all incidental low current power needs such as lights and power outlets. The internally contained automation machinery for ITC manufacturing can be hydrogen powered with a turbine generator or can be powered with conventional hydrocarbon feedstocks (optionally utilizing the media flow from bypass piping in hot tapping/line stopping mode), or by a combination of the two. Additionally, when applicable all remote ancillary installation equipment such as winches, forklifts and other material handling equipment can be battery powered.

Once the AMV is driven to the jobsite or if offloaded on jobsite it can be affixed to the TDC and driven to site for appointment and positioned for appointment. The AMV can have the static (non-expanded) capability of manufacturing ITCs from 4" diameter to 18" diameter and the dynamic hydraulic actuated (expanded) width to facilitate the introduction of feedstock for production of ITCs 20" in diameter or greater. The AMV can incorporate HVAC environmental systems for specified application parameters and the manufacture of ITCs for inclement weather conditions.

During the described installation process, the onsite automated cannular assembly manufacturing process in the AMV is operating to produce the cannular assembly as it is being pulled and/or pushed into the pipe. This manufacturing process commences with the loading of two spools of feedstock into the mounted mechanical fixtures. These fixtures or cradles afford motorized rotation of the feedstock spool into the AMV automated cannular assembly manufacturing system. The mechanical rotation of the spools is PLC/PC interfaced and precisely synchronized for linear feed speed with all other automated manufacturing processes and cannular assembly advancement and installation mechanics.

The AMV contains independently pivoting segments, on each of which various stations for manufacture of the innervated tubular composite can be mounted. In turn, the AMV comprises an articulating forming mandrel for the onsite manufacturing and dynamic appointment of the coiled innervated tubular composite. The AMV is suited for the manufacture of the coiled-tube structure.

The series of segments can be connected through pivot joints. Preferably, each segment comprises a platform floor, in order to facilitate inspection and repair. Each of the machine segments can be supported by wheels, optionally mecanum wheels, capable of individual steering and propulsion. Preferably, the various fixtures required for installing a single individual layer of the innervated tubular composite is mounted on a single segment.

In another embodiment of the AMV, the mounting fixtures of the axial application fixture, sensor winders, radial winders and over-mold winders can be affixed to an articulating floor plate affixed to the bed of the drivable or towable installation unit. This articulating floor plate would resemble the design and functionality of traversing platforms on baggage carousels at airports wherein individual and uniquely shaped sections are connected so as to afford articulation on a flat plane. The utilization of this floor plate would mitigate the requirement for the individual articulating and controlled sections for each of the application and winding components on the drivable and towable trailer. This embodiment would typically be used for smaller diameter cannular structures and/or smaller diameter coils.

The articulating mandrel on the AMV cantilevers from its attachment through the center passage of each of a plurality of winding and application stations. Preferably, on each segment of the AMV is mounted a single station for manufacture of a single cylindrical layer of the ITC. This plurality of winding and application equipment is affixed to the articulating platforms, which pivot independently of each other to afford controllable and acute articulation.

Preferably, the AMV is oriented with each individual segment of the mandrel juxtaposed with a single segment of the AMV, so that articulation of the AMV segments from straight to curved, or between different radii of curvature, is matched by simultaneous articulation of the mandrel segments. The mandrel may be articulated either actively, by powered drives located in the mandrel, or passively, via contact forces transmitted through individual stations on each segment of the AMV. In this fashion, curvature of the growing ITC can be adjusted with a minimum of applied stress to the growing ITC.

As the individual segments of the AMV articulate from straight alignment to an acute radius alignment, the attached winding and application equipment move concurrently, and mimic the matching alignment, thus manipulating the articulating forming mandrel into the precise radius or curved orientation required as controlled by the embedded software systems. The electromechanical functionality allows the articulating forming mandrel to assume the precise required radius, which in turn forms the cannular structure progressing over and along the mandrel to be shaped into the same precise form. This form is maintained during the sensor, reinforcement, and over-mold application processes.

The pivot joint connections and extension and retraction motions of linear actuators or hydraulic cylinders allow the individual segments to be controlled and turned in autonomously controlled accurate angles so the segments can, in concert, manipulate the articulating mandrel into desired curvature or bending radius. which in turn can direct hydraulic cylinders/actuators, thereby maintaining proper alignment and directing the articulating mandrel to the correct positions. This precise positional and oriental control allows the AMV to maintain fabrication precision on varying surface profiles.

The segments of the AMV can be connected through pivot joints and linear actuators and/or hydraulic cylinders. The precise position and orientation (heading, pitch, roll, and yaw) of the AMV, and the relative translational and rotational motion at each pair of articulating machine platforms begins with acquisition of locational and orientational data from one or more sensor components, optionally including lidar, proximity sensors, GNSS, and GPS. Sensor components can also provide mapping information for local ground surface contours. Preferably the sensor components are contained in or mounted on the AMV.

Navigation instructions can be determined by controllers and/or embedded software systems, optionally combined with one or more of dynamic motion algorithms, 3D models and embedded software systems which, in turn, can utilize a fusion of AI, ML, and/or CV.

In turn, the necessary operating commands to carry out the navigation instructions can be provided to electric, pneumatic, and/or hydraulic actuators, which in concert can control with precision not only the location of the AMV, but also either or both of the pivoting angle and level plane. Through this mechanism, which can be semi- or fully autonomous, precise control over the placement, orientation, and bending radius of the cannular structure can be provided.

Preferably, navigation of the AMV is accomplished with a minimum of human input, with all sensing, calculation, and actuator command being carried out autonomously. Navigation can be employed to place the AMV and its correctly at a site for initiation of manufacture. Navigation can also be employed to position and orient the AMV and its segments correctly throughout the entire course of manufacture. Navigation both before and during manufacture can ensure proper placement and orientation of the final structure. Navigation both before and during manufacture can provide the desired geometry for the final structure, including but not limited to the curvature required for the coiled-tube structure.

As well as employing methods of navigation such as GNSS, GPS, and inertial navigation the methods for operating the AMV disclosed herein can utilize manual inputs based on mathematical expressions for secondary, failsafe or backup guidance system.

The initial radius of curvature of the storage coil in innervated tubular composite will have a specified starting circumference, based on the minimum radius of curvature of the cannular structure to be installed. In turn, the minimum radius of curvature is determined by engineering design and is based on the outside cross-sectional diameter of the cannular structure, thermoplastic material properties of the inner cannular structure and the pressure rating (amount of reinforcement material) required of the innervated tubular composite.

By design, the initial loop in the coil of the cannular structure shall be no smaller than the minimum radius of curvature of the innervated tubular composite. This starting location of the AMV is spot locked in the onboard GNSS and/or GPS inertial navigation tracking systems and used as the input into the manual guidance systems. This planned circumferential measure of the OD of the first full loop is then used as an additional input into the embedded software program to be used as a check and reference to the GNSS and/or GPS guidance system. The second input into the software and GNSS/GPS guidance programs is the outside cross-sectional diameter of the cannular structure being installed.

In order to facilitate manufacture and appointment of the innervated tubular composite, in particular providing the smoothly varying radius of curvature preferred for the coiled-tube structure, the AMV provides independent wheeled propulsion, steering, and guidance. Optionally, use of mecanum wheels can improve responsiveness as well as reduce the usage and wear on the individual propulsion and steering systems.

These individual self-contained drive wheels are self-propelled and capable of providing both synchronized and independent speeds and direction of steering. This embodiment of AMV allows it to move concurrently in forward and sideways direction, sometimes referred to as "crabbing" or "crab walking", which allows for precise placement of the growing innervated tubular composite. In particular, the crab walking motion is essential for the preferred adjacent placement of successive loops in the coiled-tube structure, while at the same time providing an unobstructed path for the AMV. Absent of this functionality, such placement would be difficult if not impossible: the AMV would collide with the previously appointed cannular structure as it progresses around the diameter of the coil.

Manufacture of Sealing Layer

Manufacture of an individual cannular assembly proceeds down the mandrel, with the first step being formation of the sealing layer. Successive steps apply material to the exterior of the growing cannular assembly, except for optional spray application to the interior of the cannular assembly at the end of the mandrel.

The plastic sheet material for the sealing layer can be precut for width, preferentially 2%-5% oversized in width compared to the required circumferential measure for the manufacturing process. The material can be delivered to the jobsite on large spools, and either stored onsite or loaded onto the mobile onsite factory ("MOF") described herein, to be utilized as manufacturing feedstock for the innervated tubular composites disclosed herein. The sealing layer material is dispensed by feeding the material into a set of opposing compressive and dynamic rollers thus both pulling the feedstock from the spool and pushing the feedstock into the centering rollers (if required) or the shaper fixture. The feedstock is also assisted by an attached flat pulling strap to provide the additional tension required to feed the material through the shaper fixture and on to the forming mandrel.

Centering Mechanism

In certain embodiments, particularly if the feedstock material is of narrower width than the spool and is wound on the spool in a stepped side by side layered orientation it will enter a stationary centering mechanism prior to entering the shaper fixture. This mechanism utilizes a series of long steel cannular rollers situated in a serpentine orientation to center the material in line with the shaper fixture and mandrel if being pulled from the spool at an angle. The length of the rollers is dictated by the width of the accumulator spool. These rollers may optionally be motorized for rotation to assist in unspooling the feedstock and to push the feedstock onto the forming mandrel.

The centering mechanism provides a static level wind system for centering the feedstock material through the trimmer/beveler mechanism and then further to an initial set of forming rollers for compressing and slowly forming the feedstock material into a cannular or cylindrical shape. The plastic feedstock material enters the centering mechanism at varying angles, governed by the width of the feedstock material, the width of the accumulator spool, and the horizontal positioning of the material to the spool face at any given rotation of the accumulator spool. As the feedstock material is pulled into the centering mechanism, the series of vertically opposing and staggered rollers guides the material to the center of the mechanism, since the flat pulling strap, which is attached to the center of the material, is at the exact centerline of the trimmer/beveler mechanism and the forming mandrel followed by the remaining automated manufacturing equipment. Once the material traverses through the final series of roller mechanisms, the centerline of the material aligns exactly with the centerline of the subsequent manufacturing equipment and processes.

In certain embodiments, particularly when the feedstock material is substantially the same width as the spool, and for which a stepped side by side winding on the spool is not required, the centering mechanism need not be used. By positioning the spool appropriately in the AMV, the feedstock material will unroll from the spool inherently centered with the shaper fixture and the mandrel.

Trimmer/Beveler

In certain embodiments, particularly if the width of the feedstock material—and thus the circumference of the sealing layer—must be controlled to a high precision, the feedstock material will then progress through the trimmer/beveler mechanism. As the material progresses through the trimmer/beveler mechanism the outside edges of the material feedstock are mechanically trimmed to the exact width required for the radial measure of the sealing layer. This trimming process also incorporates a bevel or miter in the edge of the material of opposing angles on opposite edges. These opposing angles create a smooth mitered joint when the sealing layer is formed into a cannular structure and the seam is welded. By mitering the seam, the material overlaps itself thereby increasing the integrity of the weld.

In certain embodiments, particularly when the tolerance for the width of the feedstock is fairly relaxed, the trimmer/beveler mechanism need not be used.

Also, for embodiments that use a fusion welder to join the two edges of the feedstock, these edges do not require a bevel or miter, nor are the butt edges of the feedstock required to be perfectly smooth. In these embodiments, the trimmer/beveler mechanism need not be used.

Shaper

The sealing layer material enters the shaper fixture, located downstream from the spools, the optional centering mechanism, and the optional trimmer/beveler. The concentric shaper fixture is a series of specifically oriented rollers and or structural segments oriented axially with a concentric and continuous reduction in radial aspect which compresses and subsequently forms the feedstock material into a cannular structure of the specified internal diameter as it progresses onto the forming mandrel with the seam miter now aligned and compressed for welding and overlay.

For certain sealing layer material compositions and/or thicknesses, the material may be softened by heating the material to assist in the forming process. The material heating process if needed will be completed by internally heating the structural forming segments, inline heaters, autoclave, or similar system that is mounted on the spool cradle. Once the growing cannular cylinder is between the mandrel and the circumferentially oriented compression forming guides, the growing cannular cylinder finalizes to form the ID required for the sealing layer of the cannular assembly.

The innervated tubular composite is fashioned with a continuous and monolithic longitudinal seam. The aligned and compressed seam is welded by fusion, UT, or thermal welding processes, depending on the sealing layer material composition and the thickness of the material. Most generally fusion welding will be used as it is the most expeditious and results in the highest integrity for most thermoplastic materials. The process heats the feedstock material through the application of heated like material being applied to the surface at the seam area. This heated material softens the feedstock material allowing it to flow together as well as incorporate the additional material being applied into the seam. Once the seam is complete it is compressed and planed smooth with a non-stick compression roller. The seam is then cooled via a flow of cold water or cooling fluid or by cold air. The mechanical properties of the resulting seam will be equal to or greater than the mechanical properties of the bulk material, to assure the seam's strength and watertightness. As the now cylindrical sealing layer structure passes the welding process it can additionally be immediately coated on the internal side of the seam with like material to increase the seam's integrity and or assist with permeation resistance. The material utilized in the process is preferably the same as the material used in the sealing layer in a thermoset composition, assuring a molecular bond and chemical crosslinking in the repair as opposed to simple adhesion. The thermal material is overlaid on the seam and cools to ambient temperature in 2-3 seconds. The sealing layer cannular structure then progresses along the forming mandrel a few inches where the seam is exposed to one or more phase array flaw detectors, spark testing and isolated seam pressure testing. These inspection processes assure the seam's integrity parameters and requirements as set per specification. If a detector identifies a flaw in the seam, the manufacturing process is ceased, and quality control measures are initiated until the seam area passes inspections. The sealing layer then continues to traverse along the forming mandrel for the application of the axial reinforcement fabric.

Manufacture of Axial Reinforcement Layer

During the growing cannular structure's progression down the articulating mandrel, it will traverse through a plurality of winding and application equipment. The first process in this progression is the application of the axial reinforcement filaments facilitated by way of the axial reinforcement application device. In one design, eight or more axial reinforcement filament spools are used to store and apply the reinforcement material onto the structure. The spools are uniformly distributed along the cannular structures hoop direction and individually mounted to the frame.

Slot centering apparatus openings can be provided in the frame for passage a precise placement of material from the spool to the growing structure. The axial reinforcement material is then unwound from each of the spools as the cannular structure progresses down the articulating mandrel. The axial reinforcement filaments are intrinsically pulled through the slot openings in the frame and mounted on the outside surface of the cannular structure. This equipment and process utilizes a plurality of filament storage spools, which store the reinforcement filament. As the cannular structure progresses along the forming mandrel, the axial filaments are applied to the outside surface of the cannular structure material. They are applied in a circumferential array around the cannular structure. The number of spools and application slots are determined by the cannular structure's ID and the width of the micro-rope filaments. The application of the axial reinforcement filaments requires that there be limited or no space in-between the filaments along the cannular structure. This assures that the inner thermoplastic cylinder of the cannular structure has full coverage structural support of the axial filaments, and provides resistance to axial loading both from internal pressure once put into service and from pulling the cannular structure away from the mandrel once complete.

For linear innervated tubular composites, the reinforcing feedstock can comprise micro-rope filaments which are bound together longitudinally with EVA or similar resin to create a sheet fabric. This fabric is manufactured to the correct width and stored on one or more feedstock spools for the manufacturing process. During the manufacturing process the micro-rope generated filaments retracts off the applicator storage spools, is aligned and then draped over the sealing layer, tensioned, and secured by the subsequent hoop reinforcement to produce a circumferential layer of axial reinforcement in the innervated tubular composite. Upon full encapsulation of the plastic cylinder circumference the axial reinforcement filaments are pulled into slight tension to assure that all wrinkles are eliminated and that all reinforcement fibers—micro-ropes—are in appropriate orientation relative to the sealing layer cannular structure. Upon completion of this process the axial reinforcement filaments are secured to the sealing layer by the subsequent application of the hoop reinforcement windings.

For curved innervated tubular composites, use of a sheet fabric for manufacture of the axial layer is not ideal, since a two-dimensional sheet cannot easily accommodate the curved surface of the curved tube. Instead, individual filaments are applied to carefully chosen paths along the entire curved surface. The separational application of the axial reinforcement filaments in innervated tubular composite are crucial to the designed pressure resistance of the cannular structure. The axial reinforcement filaments are expelled from the spools and are applied to the surface of the cannular structure individually, as the rate of application for each filament from each spool will preferably vary depending on the filament's location on the curved surface of the growing structure. This variation is dependent on the proximity of orientation of the filament to the circumference of the cannular structure as well as the axial radius of the cannular structure at any one time. As the cannular structure is manipulated into a radius during manufacturing, an axial filament located on the inner surface of the cannular structure will be shorter than an axial filament on the outer radius, and therefore will be applied at a slower rate. The filaments along the circumference of the cannular structure in-between the inner and outer radius will have varying degrees of change in length and application speed, so it is required that these filaments be applied individually along the axis of the cannular structure to assure the most precise and engaged length and alignment of the axial reinforcement to achieve the highest achievable pressure rating by design and long-term safety.

Manufacture of Hoop Reinforcement Layer

The next application in the automated manufacturing process is the installation of one or more hoop reinforcement layers. This layer will most generally be of high strength carbon fiber micro-rope filaments; however, other materials may be used.

The filament feedstock is stored on an array of spools that are oriented and affixed to the OD of the orbiting filament winding machine. The material is fed to the winding device through a centering barrel for application to the cannular structure. This machine is open in center allowing for passage of the forming mandrel and the cannular assembly during the manufacturing process.

The hoop reinforcement application device is oriented and mounted at a right angle or slightly askew to both the articulating mandrel and the traversing cannular structure during the application process. This fixed orientation assures that the hoop reinforcement filaments will always be applied precisely perpendicular or at design designated angle to the longitudinal axis of the cannular structure. This alignment assures that the filament orientation, alignment, and engagement results in the highest degree of hoop resistance as possible. It also assures that the most inner thermoplastic cylinder of the cannular structure is under compression and not tension when subjected loading from internal pressure.

The cannular structure is propelled along the fixed or articulating mandrel while proceeding through the center of the external winder machine. Orbital motion of the winding machine combines with the traverse of the cannular structure to form a helical structure for the axial reinforcement layer. The winder machine is automated and electromechanically controlled for orbiting speed based on the traversing speed of the cannular structure along the forming mandrel, filament tension, and pitch. As the cannular assembly traverses down the forming mandrel, the orbiting fixture winds the hoop reinforcement filament onto the cannular assembly in a helical orientation.

The hoop reinforcement application device is affixed to the articulating platform, assuring that the hoop reinforcement is applied in the precise orientation independent of the curvature or radius of the cannular structure during manufacturing. This functionality also assures that the hoop filaments on the outer radius of the cannular structure remain in alignment next to each other without separation so there are no gaps in between the filaments, depending on the manufacturing specification, design, and composition/thickness of the sealing layer material. The hoop filaments are wrapped in a manner so that each filament aligns next to—butts up to—or partially overlaps the previous wound filament to assure that there are no spaces in between the filaments.

There could be one or a plurality of the hoop reinforcement application devices as determined by design and requirement. Ha plurality of devices is utilized, the orbiting or rotational direction of the devices are preferentially in opposition, so that the filaments are being applied in an opposing radial orientation so as to increase the overall strength of the reinforcement.

By way of example, the maximum speed of the hoop reinforcement winding may be able to facilitate orbital winding of the cannular structure along the forming mandrel at traversing speeds of 25 ft./min based on diameter and reinforcement amount.

Upon completion of this winding process, the cannular assembly travels on the forming mandrel under a computer vision sensor to assure proper pitch and to record pitch data for historical record as with all other manufacturing processes.

Multiple hoop reinforcement winders may be located along the manufacturing "line", providing identical functionality as the first orbital winder. The additional winders can provide manufacturing redundancy to facilitate reloading of storage spools, or to work around mechanical failure of a single winder. The additional winders can also provide contra-helical wraps of reinforcement, which can afford more uniformly distributed loading on application of strain to the ITC from internal pressure.

The winding and application equipment can be compartmentalized and positionally interchangeable, in order to readily change the order of layers or to add additional or specialized layers to the cannular assembly. To increase the storage capacity and winding speed of the radial winder, it can have multiple storage spools incorporated in the orbiting section of the winder.

Incorporation of Sensor Array Layer

One or more sensor array layers may be applied over any of the cannular assembly layers and/or internally incorporated onto the internal surface of the sealing layer, depending on project specification. In some embodiments, a sensory array layer is helically oriented around the axial reinforcement layer. In some embodiments, a sensory array layer is helically oriented around the hoop reinforcement layer. The sensor array layer can also be installed in either a longitudinal or helical orientation on the cannular assembly. The sensor array layer feedstock can be stored on one or more spools mounted on an orbiting fixture. This fixture is open in center allowing for passage of the forming mandrel and the cannular assembly for passage through during the manufacturing process. The sensor array layer most typically will be installed in a helical orientation. The dimension of the spiral axis is determined by the cannular structures' traversing speed over the articulating mandrel and the orbiting speed of the winder device itself. In other applications, a sensor array layer may be installed along the longitudinal axis of the cannular assembly. The orientation of the sensor cable as it relates to the curved or degree of radius of the cannular structure during manufacturing is not critical, as the spiral of cable is applied on the radius of permanence and provides no structural support to the completed cannular structure. As the cannular assembly traverses down the mandrel, the orbiting fixture winds the sensor array onto the axial or hoop reinforcement layer. Alternatively, the orbiting fixture can remain stationary for installation of the sensor array layer in an axial orientation along the cannular assembly. There may be one or a plurality of these sensor wire winding devices as determined by design and requirement.

Incorporation of Sensor Wires

A further step in the manufacturing process is the application of the sensor wire onto and over the axial reinforcement. This sensor wire most generally will be Pd-coated tapered optical fiber for acoustic communication of data for the identification, classification, and overall health monitoring of the cannular structure while in service. In some embodiments, the sensor wire is a Pd-alloy coated tapered optical wire.

The sensor wire is stored on spools and is applied by way of a winding device which wraps the wire in a spiral on and around the cannular structure. The dimension of the spiral axis is determined by the cannular structures traversing speed over the articulating mandrel and the orbiting speed of the winder device itself. The orientation of the sensor wire as it relates to the curved or degree of radius of the cannular structure during manufacturing is not critical as the spiral of wire is applied on the radius of permanence and provides no structural support to the completed cannular structure. There may be one or a plurality of these sensor wire winding devices as determined by design and requirement.

Manufacture of Protective Layer

Upon completion of the hoop reinforcement layer installation the cannular assembly traverses further along the forming mandrel into the protective layer installation segment of the mandrel manufacturing process.

In one embodiment, a band of protective material is helically wrapped around the surface of the hoop reinforcement layer. This layer provides protection of both the hoop reinforcement layer filaments and the sensor array layer during the installation process. The protective layer feedstock is stored on an array of spools that are oriented and affixed to the OD of the orbiting filament installation fixture. This fixture is open in center allowing for passage of the forming mandrel and the cannular assembly for passage through during the manufacturing process. As the cannular assembly traverses down the mandrel, the orbiting fixture winds the protective layer onto the hoop reinforcement layer.

For protective layer formulations that include materials such as carbon fiber, Kevlar, polythene, polyolefin and PET, an optional tension/compression process can be incorporated at this point. Once the protective layer is fully wrapped onto the hoop reinforcement layer the cannular assembly traverses through a heating element such as an autoclave to slightly shrink and tension the protective layer over the underlying layers. This tension/compression process affords confinement and retention of the underlying layers in their proper design orientations during the push/pull installation or appointment process. This material compression will assist in maintaining the specific orientation of the layers below during the pull-in-place installation process therefore, assuring the alignment required for the previous layers to provide the structural resistance as designed. This compressive process of the protective layer also adds increased buckling resistance to the innervated tubular composite by increasing the cohesive strength of the layers.

Incorporation of Over-Mold Protective Layer

In one embodiment, the hoop reinforcement layer can be autonomously wrapped with pre-impregnated carbon fiber tape or over-molded with a high-build rigid thermoplastic thermal spray process as the cannular assembly exits the forming mandrel. For the coiled-tube structure, this iteration in the manufacturing process can provide for an ITC without forming of the plastic sheet stock over the first cannular assembly layer. The hoop reinforcement layer can be coated with a thick film of plastic using thermal spray to provide the second sealing layer, thus obviating the need to encase the cannular assembly with plastic sheet stock. Once this second sealing layer is applied, second layers of axial reinforcement and hoop reinforcement would be installed over this over-mold coating in the same manner as in the typical manufacturing of a cannular assembly. The iteration allows for application of the second layer of the binary composite via an over-mold coating rather than the formation of thermoplastic over the first layer. The over-mold coating is performing as the sealing layer in these applications. Additionally, a final over-mold coating can be applied to the exterior of the cannular assembly for a variety of functions, including but not limited to redundant fireproofing, insulation, and puncture resistance.

This protective layer may also consist of an over-mold of carbon fiber, Kevlar, aramid, preferably para-aramid, or fiberglass fabric that has been impregnated with a UV or heat cured resin. This protective over-mold can be used on the coiled-tube structure when additional buckling resistance is required. The internal and external over-mold layer can be applied at thicknesses of 0.10 inch to 1 inch and potentially higher thicknesses where increased buckling, bending or media resistance is required. The over-mold also provides protection from puncture, damage, vandalism, or terroristic damage of the structure.

This over-mold can also consist of spray applied or extruded rigid coatings or over-molds respectively, to also increase the buckling resistance of the cannular structure. The protective over-mold fixture may also have an autoclave to heat and cure any resin impregnation in the materials. This autoclave may produce heat through infrared or provide high intensity ultraviolet light for the curing of UV resin impregnations or coatings.

The protective over-mold fixture may also incorporate an autoclave that follows the radial winder application machine to heat and cure any resins impregnated in the materials. This autoclave may produce heat through infrared radiation or provide high intensity ultraviolet light for the curing of UV resin impregnations or coatings.

In some embodiments, the over-mold protective layer is applied along the forming mandrel. In some embodiments, the over-mold protective layer is applied remote from the forming mandrel, in proximity to the site for appointment. This remote application will allow for manufacture of the structure on the forming mandrel and retain the flexibility to bend as it maneuvers towards the site for appointment. Once the structure is positioned at the longitudinal axis for appointment, it would progress through the over-mold layer equipment for application of the curable fabric and then cured prior to appointment at the designated site.

Incorporation of Specialty Coating

This embodiment affords the capability to apply traditional highly resistant thermoset coatings, thermal flame spray, austenitic metal and other metal coatings or films 360 degrees on ID of the sealing layer for future contact with the transmission media.

This methodology utilizes established methods for fixed solid-state particle deposition in the interspatial area of the forming mandrel in the automated manufacturing process.

Also disclosed herein are methods comprising the application of "cold spray" metalizing process or thermoset coating process for specialized installations on the OD of the final cannular assembly and/or encapsulating the inner surface of one or all the sealing layers of the individual innervated tubular composites a coating or film on the innermost and outermost surfaces of the final ITC and/or one of multiple layers in between. The traditional, thermal, and metalizing process is completed remotely via an affixed and suspended fixture and radial dispersion fixture or nozzle at the internal centerline of the forming mandrel fixture as part of the automated onsite manufacturing process. This internal radial dispersion fixture can also be used to apply other highly specialized coatings to the ID of the sealing layer for specialized installations. In the methods for coil storage embodiment as disclosed herein, this coating process may be performed prior to or after the cannular assembly exits the articulating mandrel.

Upon exiting this last manufacturing process, the cannular assembly continues to traverse along the forming mandrel thus dismounting the cannular assembly from the end of the mandrel and allowing it to progress to the designated site for appointment.

Appointment of the Coiled Innervated Tubular Composite

The radius of curvature the coiled innervated tubular composite will be equal to or greater than the minimum radius of curvature of the cannular structure to be installed. The minimum radius of curvature, determined by engineering design, is based on the outside cross-sectional diameter of the cannular structure, thermoplastic material properties of the inner cannular structure, and the pressure rating (amount of reinforcement material) required of the innervated tubular composite. The minimum radius of curvature will also be determined by the minimum radius of curvature of the articulating mandrel.

Once determined and prior to installation a circular steel or reinforced concrete guide wall can be constructed with the determined minimum radius of curvature of the cannular structure. Preferably, the outward face of the wall is concave, to accept the radius profile of the cannular structure's outside cross-sectional diameter. This wall allows for anchorage of the first loop of the coil assuring an accurate starting radius of the cannular coil and eliminating potential for stress concentrations of the cannular structure against the wall. Optionally, a corresponding outer wall may be located at the exterior of the site for appointment, preferably having an inward face that is concave to accept the cannular structure's inside cross-sectional diameter. This outer wall may be constructed at any time. Preferably, the outer wall will be constructed after the coiled-tube is complete. In one embodiment, construction of the outer wall is substantially concurrent with manufacture and appointment of the final loop of the coiled-tube, so as to mechanically support the structure as it is appointed into position.

In this manner, the initial loop in the coil of the cannular structure shall be no less than the minimum radius of curvature of the cannular structure composite by design. This known beginning circumferential measure of the OD of the first full loop is then used as an input into the embedded software program.

The second input into the software program is the outside cross-sectional diameter of the cannular structure being installed.

The final input is any measurement of spacing in-between each cannular structure in the coil if required. Once the manufacturing process begins, the autonomous pulling vehicle commences its GPS mapped circular path around the forming wall. The cannular structure exits the forming mandrel and traverses down an articulable roller chute that aligns the cannular structure against the previously installed loop of the overall coiled structure. The speed of the autonomous pulling vehicle is programmed and synchronized precisely with the speed of the onboard cannular structure manufacturing process and drive rollers which control the traversing speed of the cannular structure over the articulating mandrel. The speed of manufacturing and appointment is communicated as input to the embedded program. These data provide the embedded software determination of the precise length of the cannular structure appointed to the surface versus time of installation. The length of the cannular structure appointed is processed in real time as a comparative to the appointment starting point and the designed minimum radius of curvature or first loop circumference measure. These data continuously update and provide calculus for determining the exact measure of the ever-changing overall diameter of the storage coil at any point in time. As the storage coil's dimensional radius increases, the radius of curvature of the cannular structure will be continuously increased at the mandrel in degree for each consecutive circumferential wrap around the overall coil. This real time calculus is then communicated from the embedded system software to the actuator controllers. These actuators control the articulation and orientation of the articulating platforms and then connectively and immediately position the articulating mandrel at the correct radius. This mandrel orientation ultimately determines the precise and permanent radius of the cannular structure while it is being manufactured, reinforced, and appointed.

Certain innervated tubular composites may incorporate one or more valve fittings. These can be introduced by severing the structure from the mandrel at a suitable length, connecting the free end to a first port of the valve fitting, initiating manufacture of a second length of structure, and connecting the newly formed end of the second structure to a second port of the valve fitting.

The materials and methods disclosed herein offer significant improvement over current technologies as all reinforcement materials and other materials are installed in permanence on the cannular structure at the precise radius it will be appointed at in the finished coiled-tube structure. This functionality affords the cannular structure the most precise placement, orientation and engagement of reinforcement materials which results the capability of meeting or exceeding all engineering designs. More importantly, this placement, orientation and engagement remains in permanence as the cannular structure does not require any further manipulation in the degree of radius or curvature during or after their installation.

While the methods and manufactures have described in detail and with reference to specific examples thereof, it will be apparent to one skilled in the art that various changes and modifications can be made therein without departing from the spirit and scope thereof.

What is claimed is:

1. An innervated tubular composite ("ITC"), comprising one or more assemblies of concentric tubes, wherein each assembly of concentric tubes comprises, from innermost surface to outermost surface:
    a sealing layer having a longitudinal axis defining an axial direction,
    an axial reinforcement layer having a plurality of longitudinally extending filaments, wherein the axial reinforcement layer is disposed around the sealing layer in a manner wherein the longitudinally extending filaments are oriented in and extend longitudinally along the axial direction for imparting axial reinforcement to the tubular assembly,
    one or more hoop reinforcement layers disposed around the axial reinforcement layer to provide resistance to hoop stresses in the tubular assembly, and
    a protective layer;
    wherein:
    at least one of the layers in the one or more assemblies of concentric tubes is intrinsically curved; and
    the innervated tubular composite forms a coiled tube structure having one or more loops.

2. The innervated tubular composite of claim 1, wherein the coiled tube structure comprises a plurality of loops and has a spiral geometry.

3. The innervated tubular composite of claim 1, wherein the intrinsic curvature in the at least one layer is such that the innervated tubular composite, in the absence of external force, assumes a spiral geometry.

4. The innervated tubular composite of claim 1, wherein adjacent ones of the loops of the coiled tube structure are in contact with one another.

5. The innervated tubular composite of claim 1, wherein the coiled tube structure is oriented horizontally.

6. The innervated tubular composite of claim 5, wherein the longitudinal axis is oriented vertically.

7. The innervated tubular composite of claim 1, wherein the sealing layer is made from a material chosen from ABS, PE, HDPE, UHMWPE, Nylon, PEEK, PET, PSS, PDA, PLA, PLLA, PPL, ETFE, polycarbonate, and polyurethane.

8. The innervated tubular composite of claim 1, wherein the axial reinforcement layer is made from a material chosen from para-aramid fiber, unidirectional fiberglass, carbon fiber, aramid, or HDPE fabric.

9. The innervated tubular composite of claim 8, wherein the material is pre-impregnated with a further material chosen from epoxy, polyurethane, polyolefin, and EVA.

10. The innervated tubular composite of claim 1, wherein the axial reinforcement layer comprises twisted or braided micro-ropes or twisted or braided carbon fiber graphene hybrid micro-ropes.

11. The innervated tubular composite of claim 10, wherein the micro-ropes are impregnated with an EVA resin.

12. The innervated tubular composite of claim 10, wherein the micro-ropes are axially aligned.

13. The innervated tubular composite of claim 11, wherein the micro-ropes are bonded together by heating, and then cooling, the EVA resin.

14. An innervated tubular composite ("ITC"), comprising one or more the following assembly assemblies of concentric tubes, wherein each assembly of concentric tubes comprises, from innermost surface to outermost surface:
    a sealing layer having a longitudinal axis defining an axial direction,
    an axial reinforcement layer having a plurality of longitudinally extending filaments, wherein the axial reinforcement layer is disposed around the sealing layer in a manner wherein the filaments are oriented in and extend longitudinally along the axial direction for imparting axial reinforcement to the tubular assembly,
    one or more hoop reinforcement layers disposed around the axial reinforcement layer to provide resistance to hoop stresses in the tubular assembly, and
    a protective layer, wherein:
    at least one of the layers in the one or more assemblies of concentric tubes is intrinsically curved; and
    the axial reinforcement layer further comprises a Pd-coated tapered optical fiber.

15. The innervated tubular composite of claim 1, wherein the one or more hoop reinforcement layers are made from a material chosen from para-aramid fiber, unidirectional fiberglass, carbon fiber, aramid, or HDPE fabric.

16. The innervated tubular composite of claim 15, wherein the material is pre-impregnated with a further material chosen from epoxy, polyurethane, polyolefin, and EVA.

17. The innervated tubular composite of claim 1, wherein the one or more hoop reinforcement layers comprise twisted or braided micro-ropes or twisted or braided carbon fiber graphene hybrid micro-ropes.

18. An innervated tubular composite ("ITC"), comprising one or more the following assembly assemblies of concentric tubes, wherein each assembly of concentric tubes comprises, from innermost surface to outermost surface:

a sealing layer having a longitudinal axis defining an axial direction, an axial reinforcement layer having a plurality of longitudinally extending filaments, wherein the axial reinforcement layer is disposed around the sealing layer in a manner wherein the filaments are oriented in and extend longitudinally along the axial direction for imparting axial reinforcement to the tubular assembly, one or more hoop reinforcement layers disposed around the axial reinforcement layer to provide resistance to hoop stresses in the tubular assembly, and a protective layer, wherein:

at least one of the layers in the one or more assemblies of concentric tubes is intrinsically curved; and the one or more hoop reinforcement layers further comprise a Pd-coated tapered optical fiber.

19. An innervated tubular composite ("ITC"), comprising one or more the following assembly assemblies of concentric tubes, wherein each assembly of concentric tubes comprises, from innermost surface to outermost surface:

a sealing layer having a longitudinal axis defining an axial direction, an axial reinforcement layer having a plurality of longitudinally extending filaments, wherein the axial reinforcement layer is disposed around the sealing layer in a manner wherein the filaments are oriented in and extend longitudinally along the axial direction for imparting axial reinforcement to the tubular assembly, one or more hoop reinforcement layers disposed around the axial reinforcement layer to provide resistance to hoop stresses in the tubular assembly, a protective layer, and a mesh-filled annulus positioned between the one or more hoop reinforcement layers and the protective layer, wherein:

at least one of the layers in the one or more assemblies of concentric tubes is intrinsically curved; and the mesh-filled annulus is flexible in the longitudinal direction, and the mesh-filled annulus is compressively rigid.

20. The innervated tubular composite of claim 19, wherein the mesh-filled annulus comprises a cured resin.

21. The innervated tubular composite of claim 20, wherein an initial void space in the mesh-filled annulus is filled with the resin during manufacture.

22. The innervated tubular composite of claim 21, wherein the cured resin comprises a compound that reacts with a gas, thereby producing or releasing an odorant.

23. The innervated tubular composite of claim 22, wherein the gas is hydrogen.

24. An innervated tubular composite ("ITC"), comprising one or more the following assembly assemblies of concentric tubes, wherein each assembly of concentric tubes comprises, from innermost surface to outermost surface:

a sealing layer having a longitudinal axis defining an axial direction, an axial reinforcement layer having a plurality of longitudinally extending filaments, wherein the axial reinforcement layer is disposed around the sealing layer in a manner wherein the filaments are oriented in and extend longitudinally along the axial direction for imparting axial reinforcement to the tubular assembly, one or more hoop reinforcement layers disposed around the axial reinforcement layer to provide resistance to hoop stresses in the tubular assembly, a protective layer, wherein:

at least one of the layers in the one or more assemblies of concentric tubes is intrinsically curved; and the protective layer comprises an over-mold layer.

25. The innervated tubular composite of claim 24, wherein the over-mold layer comprises a white titanium-based pigment.

26. The innervated tubular composite of claim 24, wherein the over-mold layer comprises a liquid resin including a reactive agent for leak detection.

27. The innervated tubular composite of claim 26, wherein the reactive agent for leak detection changes color on exposure to a gas.

28. The innervated tubular composite of claim 27, wherein a magnitude of the color change varies depending on any one of a flow, proximity, and concentration of the gas.

29. The innervated tubular composite of claim 28, wherein the gas is chosen from hydrogen natural gas, and a natural gas/hydrogen mixture.

30. A facility for the storage of liquids or gases, the facility comprising:

one or more innervated tubular composites as recited in claim 1; and one or more terminations on each of the one or more innervated tubular composites.

* * * * *